(12) United States Patent
Schraff et al.

(10) Patent No.: US 11,719,338 B2
(45) Date of Patent: Aug. 8, 2023

(54) HAND LEVER TO PROVISIONALLY DISENGAGE A PARKING LOCK BY HAND

(71) Applicant: ZF Friedrichshafen AG, Friedrichshafen (DE)

(72) Inventors: Berthold Schraff, Friedrichshafen (DE); Horst Leichsenring, Friedrichshafen (DE); Frank Sauter, Meckenbeuren (DE); Andreas Jauch, Markdorf (DE); Armin Gierling, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/389,432

(22) Filed: Jul. 30, 2021

(65) Prior Publication Data
US 2022/0034401 A1 Feb. 3, 2022

(30) Foreign Application Priority Data

Jul. 31, 2020 (DE) ...................... 10 2020 209 675.9

(51) Int. Cl.
*F16H 63/34* (2006.01)
*B60T 7/10* (2006.01)
(Continued)

(52) U.S. Cl.
CPC .......... *F16H 63/3491* (2013.01); *B60T 7/102* (2013.01); *F16H 63/3483* (2013.01);
(Continued)

(58) Field of Classification Search
CPC .......... B60T 7/102; B60T 1/062; B60T 1/005; F16H 63/3491; F16H 63/3483;
(Continued)

(56) References Cited

U.S. PATENT DOCUMENTS 6,481,556 B1 11/2002 Haupt
8,770,057 B2 7/2014 Ruhl
(Continued)

FOREIGN PATENT DOCUMENTS

DE 198 37 832 2/2000
DE 102009028340 2/2011
(Continued)

*Primary Examiner* — Lori Wu
(74) *Attorney, Agent, or Firm* — Finch & Maloney PLLC

(57) ABSTRACT

A lever (3) for the temporary disengagement of a parking lock (2) of a vehicle drive unit (1). The lever (3) comprises a fixing piece (31) for fitting the lever (3) onto a parking lock shaft (26), which extends inside the vehicle drive unit (1) and serves to actuate the parking lock (2). The lever (3) is a hand lever with a gripping handle (32). The gripping handle (32) is designed to enable a user to apply a manual force for manual actuation of the lever (3). When the lever (3) is fitted on the parking lock shaft (26) and moved, the parking lock shaft (26) is moved from an engagement position to a disengagement position. In the disengagement position, by further movement of the gripping handle (32) into a locking position, the lever (3) is blocked against a reverse movement out of the disengagement position.

12 Claims, 13 Drawing Sheets

(51) Int. Cl.
*G05G 1/04* (2006.01)
*G05G 5/18* (2006.01)
*G05G 5/04* (2006.01)

(52) U.S. Cl.
CPC ............... *G05G 1/04* (2013.01); *G05G 5/04* (2013.01); *G05G 5/18* (2013.01); *G05G 2505/00* (2013.01)

(58) Field of Classification Search
CPC .. G05G 1/04; G05G 5/04; G05G 5/18; G05G 2505/00; F16D 2127/04
See application file for complete search history.

(56) References Cited

U.S. PATENT DOCUMENTS

| | | | |
|---|---|---|---|
| 2010/0288598 A1* | 11/2010 | Giefer | F16H 63/3491 |
| | | | 192/219.6 |
| 2017/0343106 A1* | 11/2017 | Spooner | F16H 63/3458 |
| 2018/0141525 A1* | 5/2018 | Tateno | F16H 63/3491 |
| 2018/0340594 A1* | 11/2018 | Kume | F16H 3/44 |
| 2019/0120375 A1* | 4/2019 | Herrmann | F16H 63/3483 |

FOREIGN PATENT DOCUMENTS

| | | |
|---|---|---|
| DE | 102014214870 | 2/2016 |
| GB | 2501600 | 10/2013 |
| GB | 2519756 | 5/2015 |
| GB | 2531630 | 4/2016 |

* cited by examiner

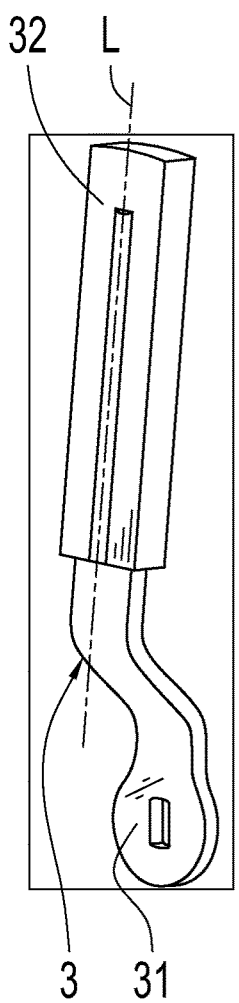 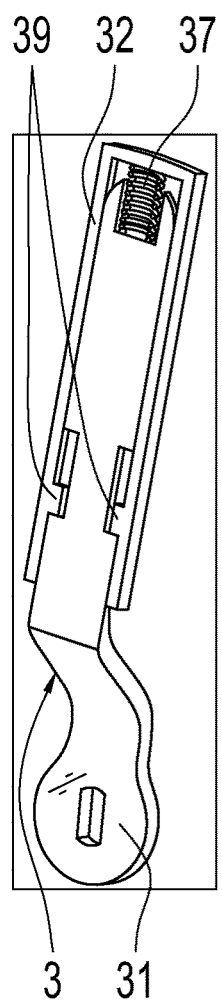 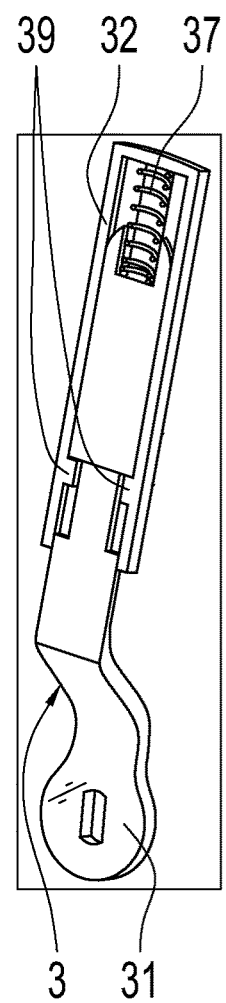
Fig. 6a          Fig. 6b          Fig. 6c
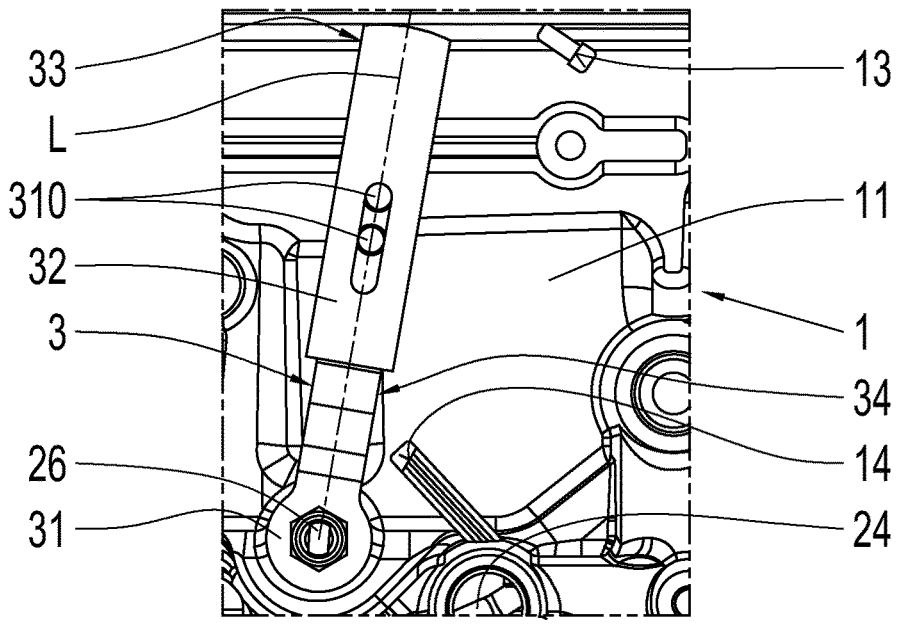
Fig. 7a

HAND LEVER TO PROVISIONALLY DISENGAGE A PARKING LOCK BY HAND

This application claims priority from German patent application serial no. 10 2020 209 675.9 filed Jul. 31, 2020.

FIELD OF THE INVENTION

The invention relates to a hand lever for the temporary disengagement of a parking lock. In addition the invention relates to a vehicle drive unit with such a hand lever and to a method for the manual disengagement of a parking lock of a vehicle drive unit by means of such a hand lever.

BACKGROUND OF THE INVENTION

Parking locks for vehicles are known and widely used in motor vehicles, in particular in combination with automatic vehicle transmissions. In its engaged condition a parking lock prevents inadvertent movement away of the vehicle equipped therewith. For example, it prevents a motor vehicle from rolling away inadvertently when parked on an incline. Parking locks operate in an interlocking manner. In that respect they differ from parking brakes that operate by friction. In a parking lock a parking pawl is usually provided, which can optionally be brought into engagement with a parking lock wheel coupled to the drive-train of the vehicle (when the parking lock is engaged) and out of engagement with it (when the parking lock is disengaged).

Usually, parking locks are engaged automatically as soon as electric power or pressure is disconnected from the associated vehicle drive unit. This corresponds to the safe condition of the vehicle drive unit. Thus, in the event of a breakdown in which the actuator system of the parking lock has failed, moving away of the vehicle is prevented or at least made more difficult. If then the vehicle is to be moved, the parking lock must be able to be temporarily disengaged independently of the parking lock actuator system. For that purpose some concepts are already known in the prior art.

From DE 198 37 832 A1 a parking lock for automatic transmissions of motor vehicles is known. In this case a piston displaces a notched disk in rotation in such manner that a locking system is actuated. The locking system engages or disengages the parking lock. In the engaged condition the parking lock can be disengaged by means of a manual actuation device. For this, the said actuation device displaces an emergency disengagement disk in rotation. A pin also displaces the notched disk in rotation. Thereafter, a retaining mechanism which holds the parking lock in the disengaged condition is engaged.

From DE 10 2009 28 340 A1 a device for the emergency disengagement of a parking lock of an automatic transmission of a motor vehicle is known. The device comprises a lever which is connected rotationally fixed to the selector shaft of the shifting mechanism of the transmission. The lever is arranged inside the transmission housing on a side of the shifting mechanism that faces toward the transmission housing. The lever can be actuated to disengage the parking lock by means of a disengagement tool that can be inserted from the outside through a corresponding opening of the transmission housing. In this case the disengagement tool is in the form of a threaded pin with an external thread. The threaded pin is screwed into the opening of the transmission housing, which is provided with a through-going thread. During this the threaded pin displaces the lever, moving it in rotation, and after the lever has moved through a certain rotation angle the parking lock is disengaged.

From DE 10 2014 214 870 A1 an emergency disengagement means for a parking lock of an automatic transmission of a motor vehicle is known. In this case the emergency disengagement means comprises an actuation element mounted on the transmission housing. Associated with the actuation element is at least one stop for the secure engagement of the emergency disengagement position. A detent for fixing the actuation element in the emergency disengagement position is provided. The said detent comprises a through-going opening on the actuation element and a corresponding opening in the transmission housing. To fix the actuation element in the emergency disengagement position a retaining pin is inserted through the through-going opening of the actuation element and into the opening of the transmission housing.

From GB 2519756 A, a mechanism for releasing an electronically controlled automatic transmission from a parked position is known. The automatic transmission comprises a selector shaft for selecting an operating position of the automatic transmission. The said mechanism consists of a manual actuation element, which is connected to a release lever by a Bowden cable. The release lever is coupled to the selector shaft in such manner that relative to the release lever, the selector shaft can be rotated through a predetermined angle. Likewise, from this document a method for releasing an automatic transmission from a parked position is known. For this, in a first mode an electronic activation of a drive-position selector and a rotation of the selector shaft between a first, parking position and a second position in which the shaft is rotated relative to the release lever takes place. And in a second mode, the release lever is rotated in a first direction, such that the selector shaft rotates synchronously with the release lever.

From GB 2501600 A and GB 2531630 A in each case a number of methods and vehicles for the manual release of a parking mode are known. In a first embodiment (see claim 1 in each case) a selector shaft is rotated from a parking mode position to a parking lock release mode position, in that a handling means ("handle means") coupled to the selector shaft is rotated to a release position. In the release position the selector shaft is detained, in that it is pinned by means of a locking pin element ("locking pin member"). In a second embodiment (see claim 5 in each case) a selector shaft is rotated from a parking mode position to a parking release mode position, in that a handling means ("handle means") coupled to the selector shaft is pivoted to a release position. In this case, however, the selector shaft is detained in the release position, in that at least part of the handle means is displaced. In a third embodiment (see claim 9 in each case) a selector shaft is rotated from a parking mode position to a parking release mode position, wherein, however, the selector shaft is detained in the release position by a hook element ("hook member").

Up to the system described in DE 10 2009 028 340 A1 all these known systems for the temporary disengagement of a parking lock are installed fixed on the vehicle transmission. Thus, they are at all times exposed to environmental conditions. This can affect their functionality adversely.

SUMMARY OF THE INVENTION

The purpose of the present invention is to indicate a simple and reliable possibility for the temporary disengagement of a parking lock and for securing the parking lock in its disengaged condition.

This objective is achieved by the measures indicated in the respective main claims. Preferred embodiments thereof emerge from the subordinate claims.

According to these a lever for the temporary disengagement of a parking lock of a vehicle drive unit is proposed. The parking lock is disengaged manually and therefore by means of a muscular force applied by the user. The lever serves for the temporary disengagement of the parking lock, i.e. in the case of an emergency when the parking lock can no longer be disengaged by the usual means, for example if a parking lock actuator system of the vehicle drive unit has failed. In the normal operation of the vehicle drive unit the parking lock is therefore actuated otherwise, in particular automatically, i.e. not manually. In particular, it can be provided that in normal operation the parking lock is actuated electrically or hydraulically. Accordingly, the lever can also be called an emergency lever or emergency hand lever.

The lever comprises a fixing piece. This is designed to fit the lever onto a parking lock shaft. Thus, the lever and the parking lock shaft are two different components. Preferably, the lever is designed to be attached to and removed from the parking lock shaft. Preferably, the fixing piece is designed so that no other tool is required in order attach the lever rotationally fixed to the parking lock shaft and to remove it therefrom. For example, the fixing piece can be made to slide onto the parking lock shaft, for example from the radial side of the shaft or from the axial side of the shaft. The fixing piece is preferably designed to be complementary to a corresponding fixing area of the parking lock shaft. Thus, an interlocking connection can be simply formed between the lever and the shaft, in order to disengage the parking lock by means of the lever. For that purpose the fixing piece can be of wrench-like form. Accordingly the fixing piece can have an end section in the form of a fork or ring spanner designed to fit over a corresponding complementary end section of the parking lock shaft. The end section of the parking lock shaft can then, for example, be in the form of a fitting square or hexagonal area or it can have fitting flattened sides.

However, the parking lock shaft preferably extends at least partially completely on the inside of the vehicle drive unit. It serves to actuate the parking lock. Accordingly, the parking lock can be actuated by moving the parking lock shaft. Thus, the parking lock can be disengaged thereby. Preferably, the parking lock is actuated by moving the parking lock shaft during normal operation of the vehicle drive unit as well. The parking lock shaft can be a selector shaft of the vehicle drive unit for the selection of various driving or operating modes of the vehicle drive unit. Thus, the parking lock is engaged by means of the selector shaft in at least one driving or operating mode and the parking lock is disengaged by means of the selector shaft in at least one other driving or operating mode. Preferably the parking lock shaft has an end section that projects out of a housing of the vehicle drive unit. This end section is then designed to be at least rotationally fixed to the fixing piece of the lever. Preferably, the said end section is the only part of the parking lock shaft that projects out of the housing.

It is provided that the lever is designed as a hand lever and, in addition to the said fixing piece, has a gripping handle. The gripping handle and hence the lever are used by gripping and applying a manual force, and is therefore actuated manually.

In particular the lever is designed so that it is arranged on the vehicle drive unit only temporarily, i.e. not permanently. In particular the lever is designed to be arranged on the parking lock shaft only as a temporary substitute for the usually used parking lock actuator system, i.e. for use in an emergency. Thus, compared with emergency disengagement devices arranged permanently on the vehicle drive unit, the lever can be made much more simply and inexpensively. For example, the lever can be made from a comparatively weaker and/or corrosion-sensitive material. Thus, when it is not necessary to use the lever it can be separated from the parking lock shaft. For example, when not in use the lever can be stowed somewhere inside the vehicle, i.e. away from the vehicle drive unit. In particular the lever is part of the tool kit of the vehicle. In that way the lever is prevented from becoming soiled or damaged when not in use, or from falling off the vehicle drive unit and being lost. Likewise, the probability of a malfunction of the lever is much reduced compared with emergency disengagement devices permanently arranged on the vehicle drive unit.

On the one hand the lever is designed so that when it is arranged on the parking lock shaft by means of the fixing piece, the parking lock shaft is carried over when the gripping handle is moved, from an engagement position to a disengagement position. The engagement position corresponds to the engaged condition of the parking lock. When the lever together with the parking lock shaft are moved to the disengagement position, the parking lock is disengaged. The engagement position and the disengagement position are respectively, in particular, rotation positions. This means that the lever and the parking lock shaft are each designed to carry out a rotation movement, whereby the parking lock is disengaged by rotation from the engagement position to the disengagement position.

On the other hand, the hand lever is also designed so that at least when it is arranged on the parking lock shaft, within the disengagement position a further movement of the gripping handle can move it to a locking position. In this locking position the hand lever and thus also the parking lock shaft are secured against a reverse movement, in particular a reverse rotation out of the disengagement position to the engagement position. In this way an undesired re-engagement of the parking lock is prevented as soon as the gripping handle is in the said locking position.

Accordingly, besides the movement of the gripping handle to the said disengagement position an additional movement of the gripping handle into the said locking position is needed, on the one hand to disengage the parking lock and on the other hand to prevent undesired re-engagement of the parking lock.

The hand lever is preferably designed so that the movement axis of the gripping handle for moving to the disengagement position is different from the movement axis of the gripping handle for reaching the locking position. In particular, these movement axes are perpendicular to one another. Preferably the movement axes cross at a point. This increases safety when the lever is operated.

Thus, by moving the hand lever to the said disengagement position alone, the lever is not yet secured against reverse movement and therefore against undesired re-engagement of the parking lock. Preferably, the movement of the lever between the engagement and disengagement positions is a rotation movement about a rotation axis of the parking lock shaft. Preferably, the movement of the gripping handle between the release position and the locking position is at least a displacement along a line, i.e. a translation movement. In particular the said line extends in the longitudinal direction of the lever. Likewise, the movement of the gripping handle between the release and locking positions can be another rotation about a (second) rotation axis. In particular this rotation axis extends in the longitudinal direction of the lever. Correspondingly, the lever and the gripping handle are specially designed to carry out the said movements and perform their respective functions.

In other words, the lever has two lever positions which the lever can adopt in any case when it is arranged on the parking lock shaft. The parking lock shaft has corresponding positions:
1. Engagement position: the lever and the parking lock shaft are positioned so that the parking lock is engaged. The vehicle is thereby immobilized. In particular this is the starting position of the parking lock and hence of the lever. In particular a spring tension of a spring device of the parking lock can ensure that the parking lock shaft and thus the lever attached to it are always pushed back to this engagement position. If a fault develops in the vehicle drive unit system or the parking lock actuation system, in that way the parking lock will be automatically engaged.
2. Disengagement position: The lever and the parking lock shaft are in this case positioned so that the parking lock is disengaged. Accordingly, the vehicle can be moved.

In addition the gripping handle of the lever has two gripping handle positions, which the gripping handle can adopt at any time if the lever is arranged on the parking lock shaft:
1. Release position: In this position the lever is released by the gripping handle and can at least be moved from the disengagement position to the engagement position.
2. Locking position: In this position the lever is prevented from moving by the gripping handle. At least the movement of the lever away from the disengagement position to the engagement position is blocked thereby.

As already explained earlier, the parking lock is a device for preventing inadvertent moving-away of the vehicle when in the parked condition. As also explained earlier, the parking lock operates in particular with interlock. The parking lock can therefore have a parking lock pawl and a parking lock wheel. The parking lock pawl can be moved by displacing the parking lock shaft, so that in the said disengagement position it is out of engagement with the parking lock wheel and the vehicle is therefore free to move. By returning the parking lock shaft to the engagement position, the parking lock pawl again engages with the parking lock wheel and the vehicle is thereby immobilized.

The vehicle drive unit is a device which is designed for use in a vehicle drive-train and serves to drive the vehicle. In particular, it is a one-stage or multi-stage vehicle transmission or an electric drive aggregate. Such a one-stage vehicle transmission has only a single (fixed) gear ratio between the drive input and the drive output. A multi-stage vehicle transmission has a plurality of gear ratios than can optionally be engaged between the drive input and the drive output. Preferably the gears can be engaged automatically. This then is an automatic vehicle transmission, for example an automated vehicle transmission of countershaft design or an automatic transmission of planetary design. An electric drive unit of the said type is in the form of an electric traction drive. Thus, it comprises at least one electric machine for driving the vehicle. The electric drive unit can in addition comprise the one-stage or multi-stage vehicle transmission in order to adapt the rotation speed and the torque of the electric machine. The vehicle is understood to be a motor vehicle such as a truck or a passenger car or a motorized bus.

Compared with the above-mentioned systems disclosed in the prior art, the proposed lever enables a safe, manual gripping of the hand lever by the user. The gripping handle is haptic and therefore facilitates the use of the lever. This should in particular be viewed against the background that a failure of the vehicle drive unit and a consequent undesired engagement of the parking lock usually takes place unexpectedly and often under difficult conditions. By virtue of the proposed design of the lever as a hand lever with a gripping handle, the temporary fitting of the lever onto the vehicle drive unit and the subsequent operation of the lever even under difficult conditions are greatly simplified. The lever can be taken off the parking lock shaft, and can therefore be carried separately from the vehicle drive unit.

Preferably, the gripping handle has gripping grooves. This simplifies the correct gripping of the handle and makes it more difficult for the hand to slip off. The gripping handle can be made of a material, or can be provided with cladding, which makes it more difficult for the hand to slip off, such as a rubber-like material. The gripping handle can be made of a material, or can be provided with cladding, such that relative to the fixing piece the gripping handle is thermally and/or electrically insulated. In particular, compared with aluminum or iron the material of the gripping handle has relatively low thermal and/or electrical conductivity, such as one of the common polymers. This prevents injury to the user when he touches the gripping handle.

Preferably, the gripping handle and the fixing piece are made from different materials. For example the gripping handle can be made of plastic and the fixing piece can be made of metal, wherein fiber-composite materials are also regarded as plastics. Thus, the fixing piece can be a component of the lever produced by a stamping process. The gripping handle can then be a component of the lever produced by injection molding. In that way the lever can be produced particularly inexpensively.

Preferably, the lever has a securing device which secures the gripping handle in the locking position and/or the release position. For that purpose the two gripping handle positions can for example be designed as detent positions. In that way an inadvertent change of the particular gripping handle position engaged, in particular the locking position, is at least made more difficult.

In a possible embodiment the lever is designed such that the gripping handle is moved from its release position to its locking position manually. Thus, by applying a manual force to the gripping handle, the handle is moved by hand from its release position to its locking position. This ensures that the movement to the locking position is a conscious process carried out by the user.

In another possible embodiment, the lever is designed such that the change of the gripping handle from its release position to its locking position takes place with the help of a spring force. Thus, to change the gripping handle from its release position to its locking position no manual force as such has to be applied to the handle. Correspondingly, when moving the gripping handle from its release position to its locking position the user is assisted by the spring force. This assumes that the spring force has previously been built up. This build-up of the spring force takes place in particular by the user before or while changing the lever from its engagement position to its disengagement position. In this case the movement of the gripping handle from its release position to its locking position can for example take place by virtue of a "snap-fit" of the gripping handle, i.e. by rapid release and thus triggering of the spring force while maintaining the disengagement position of the lever. Likewise, in this case the gripping handle can be moved to its locking position by a hand movement assisted by the spring force.

Preferably, the length of the lever is variable. Thus, the locking position can be engaged simply by changing the length of the lever. The length of the lever in the release position is then different from the length of the lever in the locking position. For example in the locking position the lever can be moved against a stop, or latched, to block a reverse movement out of the disengagement position. In the release position the lever can then be moved past the stop or unlatched in order to permit a reverse movement out of the disengagement position. In particular, when the gripping handle is moved to the release position the lever is made shorter and when the handle is moved to the locking position the lever is made longer.

Preferably, the fixing piece and the gripping handle are made such that they can move relative to one another. This can simplify the movement of the gripping handle between the release position and the locking position. In particular, the release position and the locking position correspond to two different relative positions of the fixing piece and the gripping handle.

The fixing piece and the gripping handle can be made integrally with one another. They then form a common structural element of the lever. For this, the gripping handle and the fixing piece can be produced together from a single piece of a semifabricate. The lever can be designed such that the gripping handle and the fixing piece cannot move relative to one another, or can do so only to a very limited extent. Thus, during the movement of the gripping handle between the locking position and the release position, the fixing piece too is carried with it. In such a case the fixing piece is preferably designed such that its coupling to the parking lock shaft tolerates that movement. Accordingly the movement of the gripping handle to the locking position has no effect on the disengaged condition of the parking lock. To achieve some mobility between the fixing piece and the gripping handle in the case of a one-piece lever, a constriction can be provided between the fixing piece and the gripping handle. This constriction allows elastic and/or plastic bending between the fixing piece and the gripping handle. Thus, the gripping handle can be moved to the locking position and can remain there without applying a manual force. Such a one-piece lever is relatively simple to produce and can therefore be made inexpensively.

In another embodiment of the proposed lever, the gripping handle and the fixing piece each form a respective component of the lever. Thus the lever is made in at least two pieces, of which the gripping handle and the fixing piece are each a structural element. In particular, in this case the gripping handle and the fixing piece can move relative to one another. Thereby, the gripping handle can be moved relative to the fixing piece, into the locking position. In this way, the gripping handle can be moved to the locking position simply and without changing the disengagement position of the lever. Here, in particular the gripping handle and the fixing piece are mounted and can move relative to one another by virtue of one or more bearing points. Preferably, the gripping handle and the fixing piece are connected directly to one another. The gripping handle of such a multi-component handle can be moved very simply between the release position and the locking position, Thus, such a multi-component lever can be particularly user-friendly.

Preferably the gripping handle is arranged on the fixing piece displaceably and/or rotatably. Thus, at least the locking position can be adopted by rotating and/or displacing it. For example, the gripping handle can be arranged displaceably on a shaft of the fixing piece. Then, the locking position can be engaged by displacing the gripping handle. A displaceable connection between the gripping handle and the fixing piece is simple to produce, so the lever can be made inexpensively. The displacement can take place by a purely translational movement of the gripping handle on the fixing piece. For this, for example a straight slotted guide can be used, which acts between the fixing piece and the gripping handle. Alternatively the displacement can also take place as a combined translation and rotation movement of the gripping handle on the fixing piece. For this, for example a slotted guide along an inclined plane, or a thread, or a ramp can be used, which acts between the fixing piece and the gripping handle.

Preferably, a spring element is arranged between the gripping handle and the fixing piece, which spring pushes the gripping handle to the locking position or to the release position. In particular, in the unloaded condition the spring element automatically moves the gripping handle to the locking position or to the release position. In that way, the above-explained spring force can be produced on the gripping handle in a simple manner. This simplifies the operation of the lever. The spring element can perform the function of the said securing device, since thereby the disengagement of the position concerned is made more difficult.

The lever can be designed such that by moving the lever to the disengagement position the spring element is automatically stressed, in particular by means of a ramp contour. Thus, in this case the gripping handle is moved in the direction of the disengagement position at the same time as this lever movement. When the disengagement position is reached, the spring element can then be relaxed by moving the gripping handle to the locking position. For example, when it reaches the disengagement position the gripping handle automatically snaps into the locking position due to the spring force built up. This further simplifies the use of the lever, since the spring element is stressed automatically when the movement to the disengagement position takes place. The ramp contour can for example be arranged on the gripping handle and/or on the housing of the vehicle drive unit.

Preferably, the gripping handle and the fixing piece have co-operating stops. In a controlled way these limit at least the movement of the gripping handle into the locking position. Moreover, in this way the movement of the gripping handle to the release position can be limited. This prevents an inadvertent pulling away of the gripping handle from the fixing piece. In that way too, no extra stops for limiting these gripping handle movements are needed on the vehicle drive unit.

Preferably, the gripping handle has at least one latched position. This can be the release position or the locking position. This makes it more difficult to move the gripping handle inadvertently out of the position concerned, and it therefore constitutes the securing device. In particular, both of these position are designed as latched positions. Preferably, no further latched positions are provided for the gripping handle. The latching action in the latched position is in particular brought about by a co-operation of the gripping handle and the fixing piece, for example by latching hooks or latching catches. In other words, the latch action for forming the said latched position(s) takes place in particular between the gripping handle and the fixing piece.

Preferably, the gripping handle has a first contact area. This first contact area is provided specially to make contact with a first stop on the vehicle drive unit in the locking position. This secures the lever against reverse movement back to the engagement position. This is a simple and thus inexpensive possibility for preventing the undesired reverse movement of the lever. In particular, the first stop is on the outside of the housing of the vehicle drive unit. It can for example be in the form of a housing rib or a stop-bolt or stop-screw. The first stop and the first contact area are therefore so arranged relative to one another that in the direction of the disengagement position the lever can move past the first stop when the gripping handle is in the release position.

Preferably, the gripping handle or the fixing piece has a second contact area. This second contact area is provided specially to make contact with a second stop on the vehicle drive unit in the disengagement position. This prevents a further movement of the lever beyond the disengagement position. Analogously to the first stop, the second stop too can be on the outside of the housing of the vehicle drive unit. Likewise, the second stop can also be in the form of a housing rib or a stop-bolt or a stop-screw. The second stop and the second contact area are therefore so arranged relative to one another that the lever cannot move beyond the disengagement position. By simple means, this prevents a problem with the mechanics of the parking lock caused if the parking lock shaft is moved too far by the lever.

The said contact areas of the lever are in particular each formed as flat faces provided specially for making contact with the respective stop. For this, for example the surface of the contact area on the lever can be made complementary to the surface of the stop concerned. The contact area can also be additionally hardened to avoid damage at that point. Furthermore, the contact area can be additionally damped to avoid noise there.

Preferably, the first contact area and the second contact area are arranged at different longitudinal positions of the lever. In that way housing structures of the vehicle drive unit in any case present can be used as stops. In particular, the first contact area is on the gripping handle and the second contact area is on the fixing piece. If a relatively soft material is used for the gripping handle, for example a polymer, this damps the lever equally well against generating noise. If a relatively hard material is used for the fixing piece, such as iron or steel, this protects the lever equally well against damage or excessive wear at the second contact area.

A vehicle drive unit is also proposed. In particular this is in the form of an automatic vehicle transmission or an electric drive aggregate. The vehicle drive unit comprises the parking lock. During normal operation the parking lock can be optionally engaged and disengaged by an automatically carried out movement of the parking lock shaft. In other words normally the movement of the parking lock shaft does not take place manually but by means of an actuator system such as a hydraulic, electric or pneumatic system. The device also comprises the proposed hand lever. This lever can be fitted for the temporary manual disengagement of the parking lock, on the parking lock shaft on the outside area of the vehicle drive unit. Thus, the lever is arranged on the device when the normally used actuator system can no longer be used for disengaging the parking lock, or when the said actuator system should not be used for disengaging the parking lock on safety grounds, for example if otherwise there is a risk of damaging the device.

The lever is preferably carried in or on the vehicle. In particular, the lever is delivered as part of the vehicle drive unit. A special transport position for the hand lever can be provided on the vehicle drive unit or elsewhere in the vehicle. In this transport position the hand lever is not arranged on the parking lock shaft. The transport position can be formed by a recess on the vehicle drive unit. Alternatively, it can be provided that the lever is not carried on the vehicle and, for example, is only supplied to qualified technical personnel or a technical operation such as a towing company and workshop.

In other respects the explanations already given above about the proposed lever also apply to the proposed vehicle drive unit.

A method is also proposed for the temporary manual disengagement of the parking lock of the vehicle drive unit by means of the lever. Correspondingly, the lever comprises the fixing piece and the gripping handle. The method comprises the following steps, which are preferably carried out directly one after another and preferably by the same user of the lever:

(a) The fixing piece of the lever is fitted, in the outer area of the vehicle drive unit, onto the parking lock shaft of the vehicle drive unit. The parking lock shaft extends at least in part on the inside of the vehicle drive unit. When moved to the disengagement position the parking lock shaft disengages the parking lock. By virtue of the fixing piece, the parking lock shaft is moved when the lever is moved. Thus, the parking lock can be disengaged by moving the lever to the disengagement position.

(b) The hand lever is moved to the disengagement position by gripping the gripping handle and applying a manual force thereto. Thus, the parking lock is disengaged by a hand movement applied to the gripping handle.

(c) While maintaining the disengagement position, the gripping handle is moved to the locking position. In the said locking position the hand lever and hence also the parking lock shaft are blocked against a reverse movement out of the disengagement position. Thus, an undesired engagement of the parking lock is prevented. In particular this movement of the gripping handle also takes place manually or at least with manual assistance with the help of a spring force. Thus, the lever is secured by a further hand movement applied to the gripping handle.

After this the vehicle can be moved with its parking lock released, for example to a workshop. When the vehicle has been so moved, the hand lever can be removed again from the vehicle drive unit and stowed away in the place provided for it. To remove the lever after it has been used, the gripping handle is first moved by applying a manual force to it out of the locking position to the release position. The lever can then be moved from the disengagement position to the engagement position, which is usually the normal position of the parking lock shaft. The parking lock is thereby engaged. Finally, the hand lever can be taken off the parking lock shaft.

It can be provided that for the reliable disengagement of the engaged parking lock, the parking lock shaft has to be rotated by between 20° and 30°, preferably by around 23° in the clockwise direction, and then fixed. It can be provided that for this purpose a torque has to be applied to the shaft, which torque is at least 4 Nm and at most 16 Nm. The lever is preferably so sized and designed such that the said minimum value can be applied to the gripping handle by an ordinary manual force, but at the same time the maximum permissible value is not exceeded.

It can be provided that during the normal driving operation of the vehicle the parking lock shaft is rotated hydraulically and the parking lock is actuated thereby. That movement must not be impeded. This can be achieved by virtue of the proposed lever, with which during normal operation the parking lock is separated from the parking lock shaft. A mechanism which during normal operation decouples the lever automatically from the shaft is not necessary. For that reason the hand lever is particularly suitable in utility vehicles such as a truck or a motorized bus. In those, as a rule the reliability must be greater compared to passenger cars.

BRIEF DESCRIPTION OF THE DRAWINGS

Below, the invention is explained in greater detail with reference to figures from which embodiments of the invention emerge. The figures show, in each case in schematic representations:

FIGS. 6a to 6c: A fourth embodiment of a hand lever for disengaging a parking lock, shown in different positions and/or views, FIGS. 7a to 7e: A fifth embodiment of a hand lever for disengaging a parking lock, shown in different positions and/or views.

In the figures, the same or at least functionally equivalent components are denoted by the same indexes.

DETAILED DESCRIPTION OF THE PREFERRED EMBODIMENTS

Figure 1:
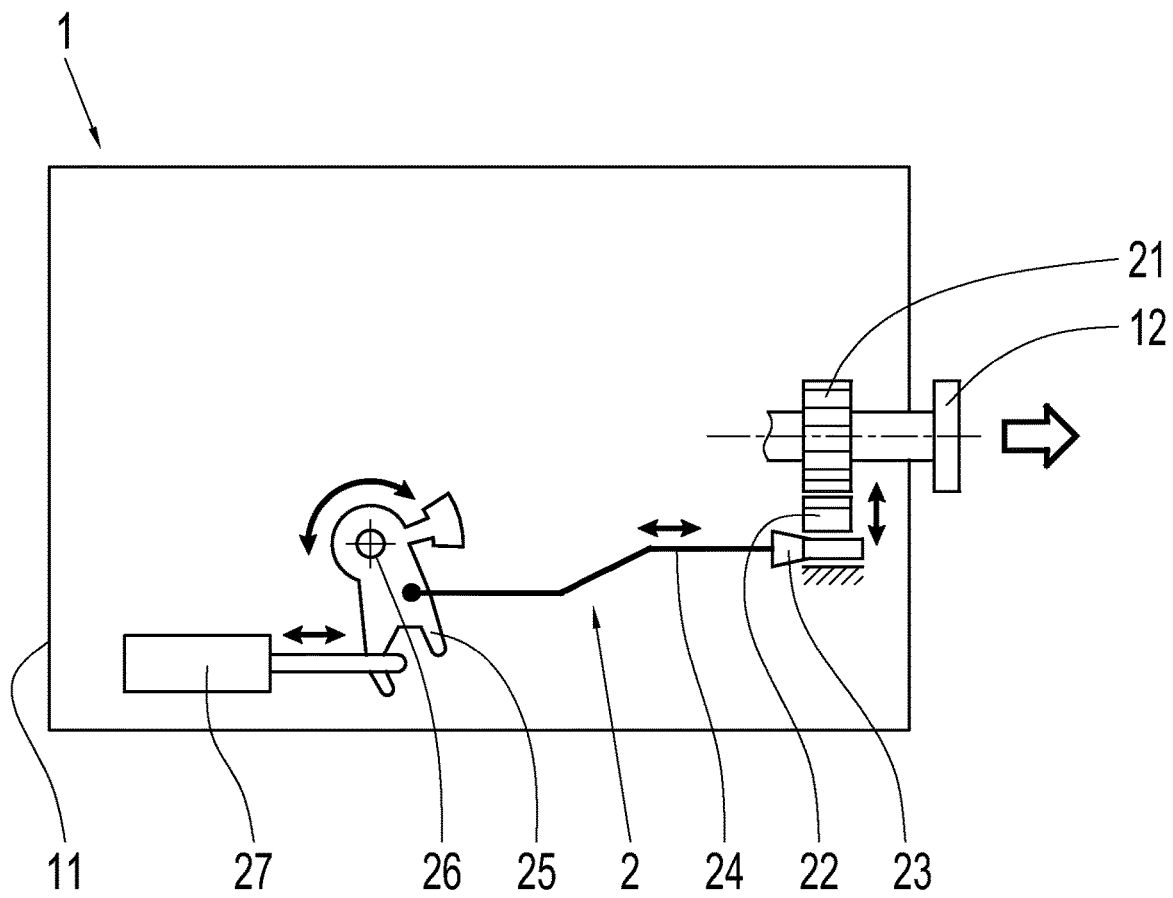
FIG. 1: A vehicle drive unit with a parking lock.

FIG. 1 shows in greatly simplified form a side view of a drive unit 1 for a vehicle, which has a parking lock 2. In this case the unit is in particular an automatic transmission or an electric drive aggregate. Such a drive unit 1 is already known as such, and for that reason only the elements essential for understanding the present invention will be discussed.

The device 1 has a housing 11 inside which the parking lock 2 is arranged. It also comprises a drive output shaft 12 driven in rotation. The drive output shaft 12 can be coupled to one or more wheels of the vehicle (not shown), so that it can drive the one or more wheels.

A parking lock wheel 21 of the parking lock 2 is coupled rotationally fixed to the drive output shaft 12. The coupling can be direct or indirect. A pawl 22 of the parking lock 2 that extends into the picture plane is mounted pivotably in the housing 11. The parking lock pawl 22 can optionally be brought into interlocking engagement with the parking lock wheel 21—and the parking lock 2 is then engaged—or brought out of engagement with the parking lock wheel 21—so that the parking lock 2 is disengaged. When the parking lock 2 is engaged, the drive output shaft 12 is blocked thereby. Thus, the wheel or wheels that can be driven by it are also blocked and the vehicle is secured against rolling away. When the parking lock 2 is disengaged this releases the drive output shaft 12 and the vehicle can then be moved.

The pawl 22 is optionally pivoted into and out of the parking lock wheel 21 by an actuation mechanism. In FIG. 1 the said mechanism comprises for example a cone 23. The cone 23 is arranged on a rod 24. By moving the rod 24 in translation, the cone 23 can be displaced correspondingly. This moves the pawl 22 and depending on the movement direction of the rod 24 the pawl is pivoted into or out of the wheel 21. Instead of the cone 23, any other suitable device for converting the translation movement of the rod 24 into a pivoting movement of the pawl 22 can be used.

The rod 24 is coupled rotationally fixed to a rotatable plate 25 of the parking lock 2. Thus, when the plate 25 rotates, the rod 24 moves in translation with it. The plate 25 can be a selector plate for selecting various driving modes of the device 1. The plate 25 is arranged on a parking lock shaft 26 and connected rotationally fixed thereto. The shaft 26 is mounted rotatably in the housing 11. Thus, the rotation axis of the shaft 26 also forms the rotation axis of the plate 25. Instead of the plate 25, any other suitable device for converting the rotary movement of the shaft 26 into a translation movement of the rod 24 can be used.

An actuator system 27 of the parking lock 2 also engages with the plate 25. Thus, the plate 25 can be rotated by the actuator system 27. In that way the parking lock 2 can be actuated by corresponding control of the actuator system 27, i.e. optionally engaged or disengaged. In FIG. 1 the possible movement directions of the elements of the actuation mechanism of the parking lock 2 are indicated by double-arrows.

The actuator system 27 is in particular a hydraulic cylinder. Thus, a working piston can be moved hydraulically, which piston in turn drives the plate 25 in rotation. It can be provided that the working piston works in an actuation direction by means of hydraulic pressure and in the other direction under spring force.

A spring force acts upon the actuator system 27 and/or the shaft 26 and/or the plate 25 and/or the rod 24 and/or the cone 23 and/or the pawl 22. This is directed toward the engagement position of the parking lock 2. Thus, without the application of a corresponding counter-force the parking lock 2 is automatically engaged. To disengage it this spring force must be overcome.

During normal operation of the device 1, the parking lock 2 is actuated by the actuation system 27. When the device 1 and/or the actuator system 27 is switched off, owing to the said spring force the parking lock 2 is engaged automatically. This prevents undesired rolling away of the vehicle when the vehicle is parked. The engaged condition of the parking lock 2 corresponds to the safe condition of the vehicle.

However, this automatic engagement of the parking lock 2 also takes place if the actuator system 27 fails. Likewise, it takes place if the device 1 develops a serious fault or when it is cut off from an energy source. In such cases the vehicle is likewise blocked by the parking lock 2.

In the figures that follow possibilities are proposed for releasing the parking lock 2 by means of a special hand lever 3. These possibilities should be used in emergency when the actuator system 27 can no longer be used or should not be used. The parking lock 2 is then only temporarily disengaged. Thus, it is not intended that the parking lock 2 is permanently disengaged by means of the hand lever 3 nor that it is actuated as standard by the hand lever 3. For that reason the hand lever 3 can also be called the emergency hand lever. In particular the hand lever 3 is not designed to be permanently fitted onto the device 1. Thus, it is a temporary solution for disengaging the parking lock 2, for example in order to move the vehicle out of a dangerous area.

Figure 2:
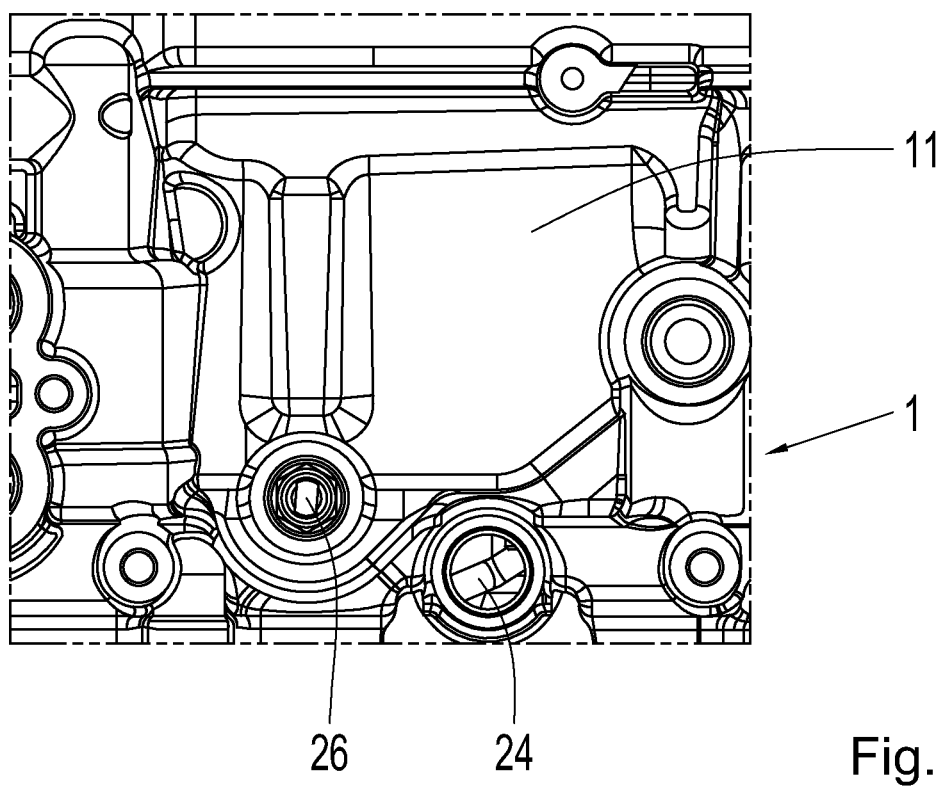
FIG. 2: An outside of a vehicle drive unit with a parking lock.

FIG. 2 shows a view of the outer wall of a housing 11 of an example of a vehicle drive unit 1, in particular such as an automatic transmission. The device 1 comprises a parking lock 2 inside the housing 11, in particular such as the parking lock shown on FIG. 1 or a variant thereof. Thus, the explanations relating to FIG. 1 also apply to FIG. 2.

Through an opening in the housing the displaceable rod 24 of the parking lock for actuating the parking lock can be seen. This opening is normally closed. The shaft 26 projects out of the picture plane of FIG. 2. The end section of the shaft 26 extends out of the housing 11. Thus, access to the shaft 26 from the outer area of the housing 11 is possible and the parking lock can thereby be actuated. Most of the shaft 26 extends within the housing 11. This also provides a means for the shaft 26 to be coupled to the rod 24, as for example the parking lock plate in FIG. 1.

As shown as an example in FIG. 1, the parking lock can optionally be engaged and disengaged by rotation the shaft 26. In the load-free condition the parking lock is engaged automatically.

The end section of the shaft 26 is also shaped in such manner that a torque can be applied there to the shaft 26, so that it can be rotated. This preferably takes place by virtue of an interlock. For that purpose, as shown here in FIG. 2 and in the subsequent figures, the end section is flattened on its sides. However, the end section can also be shaped otherwise for the purpose. For example it can have an internal or external square or hexagon.

Furthermore the end section of the shaft 26 is designed such that the hand lever 3 shown in the subsequent figures can be fixed onto it, so that the lever 3 is prevented from falling off the shaft 26. For this, as shown in FIG. 2 and the subsequent figures, the shaft 26 can have an external thread. In that way the lever 3 can be screwed onto the shaft 26 by means of a nut, as shown for example in FIG. 3b. It is possible that for this purpose the end section is shaped differently. For example it can have a transverse bore into which a securing pin can be inserted. Or it can have a circumferential groove into which a locking ring can be fitted.

FIGS. 3a to 3d show a first embodiment of such a lever 3. Here, the lever 3 consists essentially of the fixing piece 31 and the gripping handle 32. These each constitute a structural component of the lever 3. Thus, this is a multi-component version of the lever 3. The lever 3 is already positioned on the shaft 26, so that the parking lock can now be disengaged by it. For that, the gripping handle 32 is designed to be gripped directly by an operator and moved by a hand movement in order to operate the lever 3.

Figure 3A:
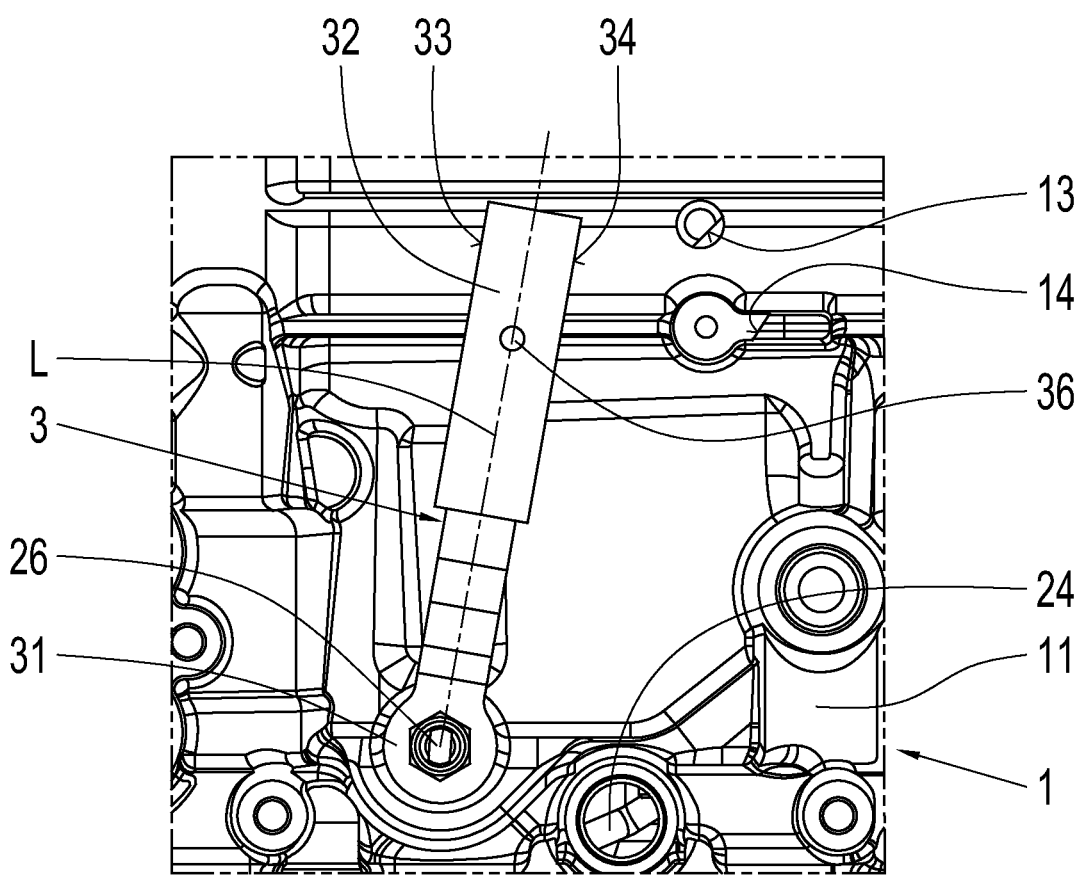
FIGS. 3a to 3d: A first embodiment of a hand lever for disengaging a parking lock, shown in different positions and/or views.

The fixing piece 31 is designed to be arranged in a rotationally fixed position on the parking lock shaft 26. For that purpose the fixing piece 31 in the area of the end of the shaft is for example shaped like a ring spanner. In that way, in the rotation direction there is an interlock between the end section of the shaft 26 projecting out of the housing 11 and the lever 3. By rotating the lever 3 the shaft 26 is rotated with it. By rotating the lever 3 to a disengagement position the parking lock is disengaged. In the figures this is a clockwise rotation. By rotating the lever 3 to an engagement position the parking lock is engaged. In the figures this is a counter-clockwise rotation. FIG. 3a shows the starting position of the lever 3 and the parking lock, in which the parking lock is engaged by the spring force. Thus, this is the engagement position of the lever 3.

As can be seen in FIGS. 3a to 3d. the end of the fixing piece 31 can be offset. Thus, the end section on the shaft side is brought closer to the shaft 26. The end section of the shaft 26 projecting out of the housing 11 can in that way be made as short as possible.

The gripping handle 32 is fitted movably on a shaft of the fixing piece 31. It can be displaced on the shaft of the fixing piece 31 along the longitudinal axis L of the lever 3. Thereby, the gripping handle 32 can be moved on the one hand to the release position shown in FIG. 3a and on the other hand to the locking position shown in FIG. 3b. Thus, the release position and the locking position correspond to two different relative positions of the fixing piece 31 and the gripping handle 32. The guiding of the gripping handle 32 on the fixing piece 31 takes place by virtue of the inner wall of the gripping handle 32 directed toward the fixing piece 31.

By moving the gripping handle 32 to the locking position the lever 3 is made longer along its longitudinal axis L. Correspondingly, when the gripping handle 32 is moved to the release position it is made shorter along its longitudinal axis L. Thus, the movement axis of the gripping handle 32 for moving the lever 3 between the engagement and disengagement positions is different from the movement axis of the gripping handle 32 for moving between the release position and the locking position. In this case the said movement axes of the lever 3 are perpendicular to one another.

The lever 3 has a first contact area 33 and a second contact area 34. These contact areas 33, 34 serve to make contact between the lever 3 and respective stops 13, 14 on the housing 11. In the release position the lever 3 is secured against reverse rotation out of the disengagement position by bringing the first contact area 33 into contact with the first stop 13. In combination with the second stop 14, the second contact area 34 prevents any inadmissibly excessive rotation of the lever 3 and the shaft 26. The stops 13, 14 are arranged on the outside wall of the housing. For example, the first stop 13 is formed by a bolt projecting out of the housing 11. And for example the second stop 14 is formed by a rib of the housing which stands proud of the housing 11. These elements 13, 14 of the housing 11 can at the same time serve other purposes and are thus provided in any case.

Figure 3B:
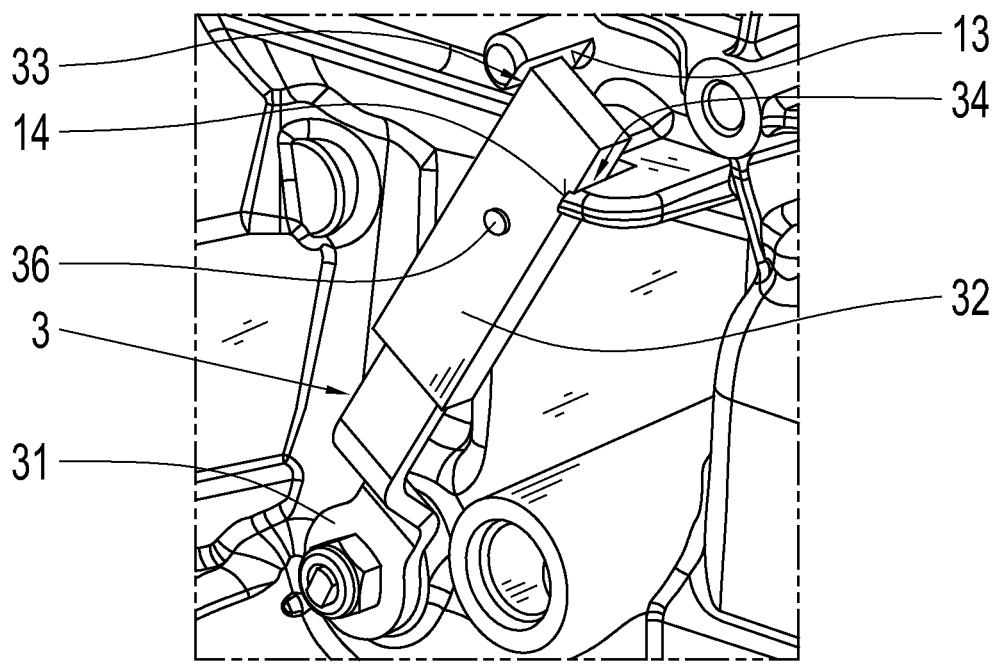
Figure 3C:
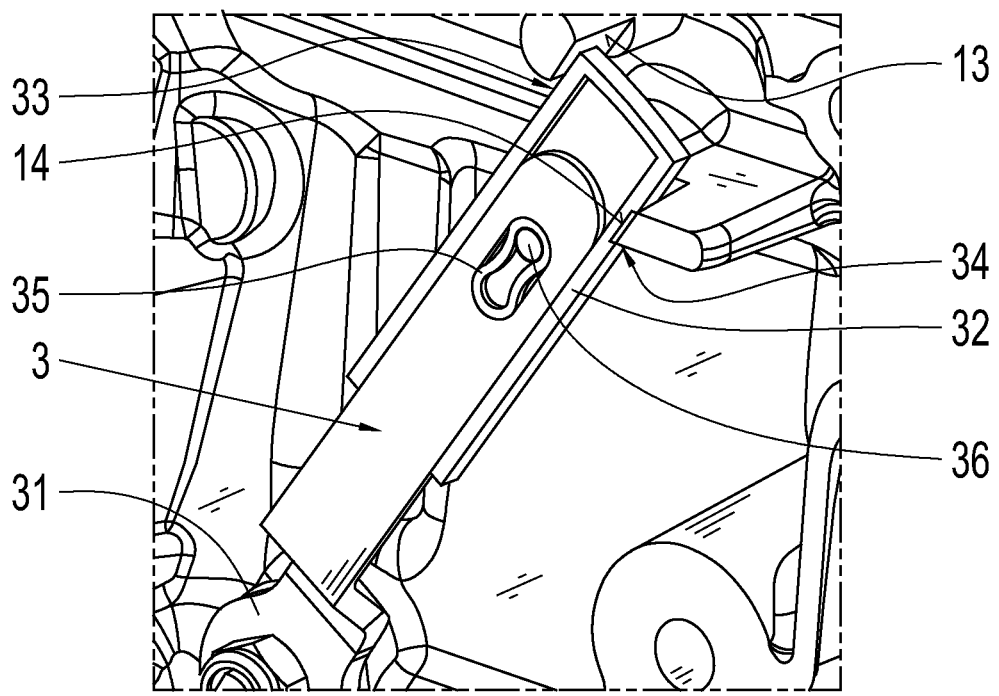
Figure 3D:
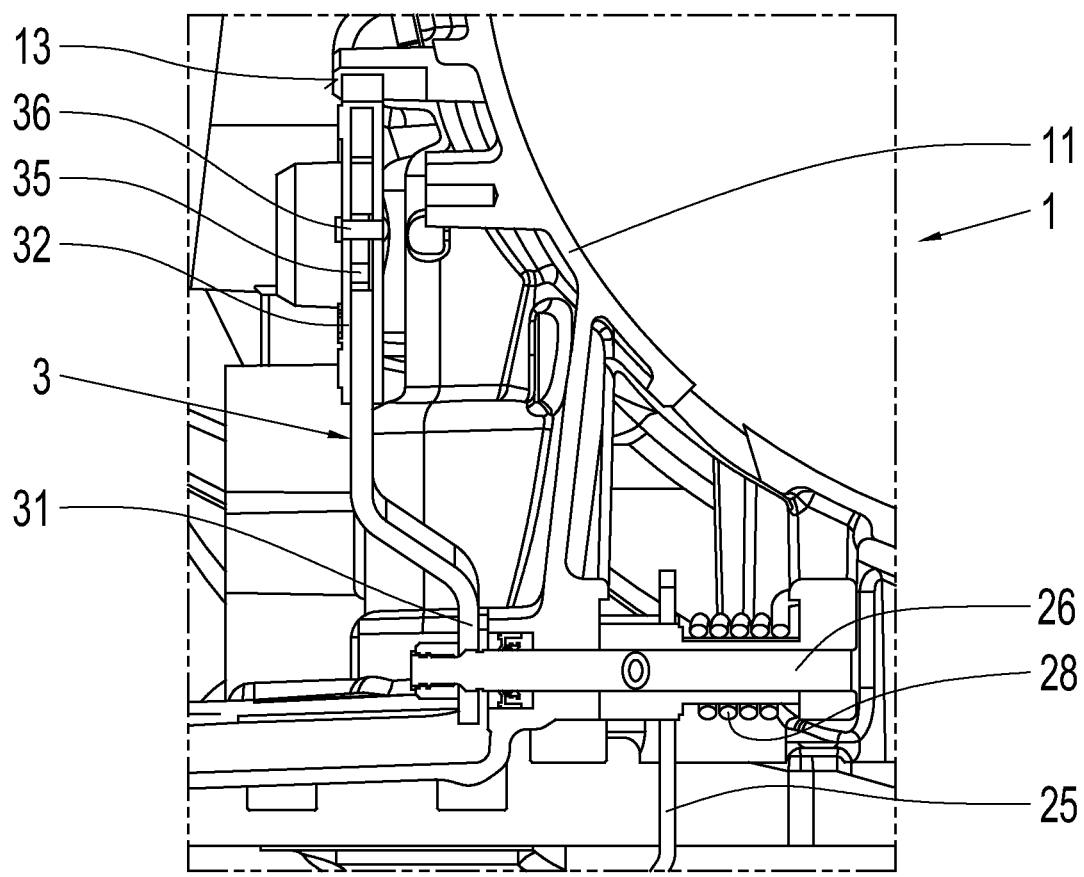

The mode of operation of the lever 3 is as follows: In the engaged condition of the parking lock the operator fits the lever 3 onto the end area of the shaft 26 and fixes it there. The lever 3 is then in the engagement position (FIG. 3a). The gripping handle 32 has already been moved to the release position or is now moved to the release position by the operator. This makes the lever 3 shorter. Thus, the first stop 13 is not in the movement range of the lever 3. Then, by a hand movement on the gripping handle 32 the operator rotates the lever 3 to the disengagement position. During this the lever 3 moves past the first stop 13. This is possible owing to the shortness of the lever 3 in its release position. As soon as the disengagement has definitely been reached, the lever 3 rests with its second contact area 34 against the second stop 14. This prevents any further rotation. This indicates to the operator that the disengagement position has been reached. Thereafter, while maintaining the disengagement position the operator moves the gripping handle 32 out of the release position to the locking position (FIGS. 3b, 3c and 3d). Thereby the lever 3 is made longer, and the first stop 13 is now within the movement range of the lever 3. By releasing the lever 3, due to the spring force of the parking lock the lever tries to move automatically out of the disengagement position and back to the engagement position.

This is prevented by the first contact area 33 and the stop 13. At the latest then, the lever 3 rests against the first stop 13.

In that way, when the locking position is engaged the lever 3 is secured against rotating in reverse back to the engagement position. As a result, the parking lock remains disengaged. The vehicle can then be moved safely, for example to a workshop. As soon as no further movement of the vehicle is required, the gripping handle 32 is first pushed back to the release position. The lever 3, together with the shaft 26, can then be rotated back to the engagement position, whereby the parking lock is engaged. After that, the lever 3 should be removed from the shaft 26 for safety reasons.

In this embodiment the contact areas 33, 34 of the lever 3 are provided on the gripping handle 32. Alternatively, it can be provided that the second contact area 33 is arranged on the fixing piece 31 and only the first contact area is on the gripping handle 32. The contact areas 33, 34 are then located at substantially different longitudinal positions on the lever 3.

On the lever 3, in particular on its gripping handle 32, marks can be made which indicate for the benefit of the operator the movement directions required for engaging the locking position and/or the release position. For example the movement direction for the locking position can be shown as "Lock"—see for example FIGS. 3a, 3b. Likewise marks can be made on the lever 3, particularly its gripping handle 32, which indicate to the operator the movement directions required for getting to the disengagement position and/or the engagement position.

FIG. 3c shows a representation of the lever 3 with a longitudinal slot through the gripping handle 32. This illustrates a preferred safety device for the lever 3, which secures the gripping handle 32 respectively in the locking position and the release position. The safety device is formed by a detent which can be overcome by applying a predetermined force to the gripping handle 32 in the movement direction required. At the same time the safety device prevents the gripping handle 32 from being pulled off the fixing piece 31. Thus, erroneous operation of the lever 3 is effectively prevented.

The safety device consists of a cutout in the fixing piece 31 arranged inside the gripping handle 32. The said cutout is in particular a longitudinal slot. A spring element 35 is arranged inside the cutout. The ends of the spring element 35 are in contact with the ends of the cutout. In the present case the spring element 35 is of oval shape with a constriction in the middle. Thus, at the two ends of the spring element 35 and the cutout, there is in each case a detent area, These two detent areas correspond to the locking position and the release position of the gripping handle 32.

The spring element 35 is elastic, so that the constriction can be bent elastically. For this, the spring element can for example be made of metal, in particular spring plate, or of plastic in particular such as rubber. The opposite sides of the gripping handle 32 (front and rear sides) prevent the spring element 35 from falling out of the cutout.

Through the cutout and the spring element 35 there passes a pin element 36. The pin element 36 is fixed in the two opposite sides of the gripping handle 32. Thus, when the gripping handle 32 is moved the pin element 36 in the cutout and the spring element 35 moves with it. To move the gripping handle 32 between the release position and the locking position, the pin element 36 must pass through the constriction of the spring element 35. Thus, the operator has to exert some manual force on the gripping handle 32 so that the pin element 36 will spread the constriction of the spring element 35 sufficiently. When the constriction has been passed through by the pin element 36, the pin element 36 will be in contact with the respective other end of the spring element 35. Thereby, a further movement of the gripping handle 32 beyond the locking position and the release position is prevented.

In this way, co-operating stops on the gripping handle 32 and on the fixing piece 31, in the form of the cutout and the pin element 36, limit the movement of the gripping handle 32 to the locking position and the release position.

The pin element 36 can consist for example of metal or plastic. In particular, the pin element 36 is inserted into the gripping handle 32 and fixed in it after the spring element 35 has been inserted into the cutout and the gripping handle has been pushed over the fixing piece 32. In this way the lever 3 can be assembled easily.

FIG. 3d shows a cross-section through the parking lock shaft 26 with the lever 3 fitted onto it. From this it is easy to see that the shaft 26 is mounted to rotate inside the housing 11 and only its end section projects out of the housing 11. The lever 3 is secured against falling off by a nut screwed onto the end section. Here, the offset of the end of the lever 3 can also be seen clearly. Likewise, the parking lock plate 25 arranged rotationally fixed on the shaft 26 can be seen, which couples the rod 24 shown in FIG. 3a to the shaft 26. Finally, also to be seen is a spring element 28 which exerts a spring force on the parking lock so that the parking lock engages automatically. The spring element 28 can also be provided at some other suitable point of the parking lock.

Preferably, the lever 3 consists precisely of the four structural components 31, 32, 35, 36 shown in FIGS. 3a to 3e.

FIGS. 4a to 4e show a second embodiment of a lever 3 almost analogous to the first embodiment, for the temporary disengagement of a parking lock. Here too, the lever 3 is a multi-component structure in which the fixing piece and the gripping handle 32 form respective structural elements of the lever 3. Below, only the differences from the first embodiment will be described. In other respects the explanations concerning the first embodiment also apply to the second embodiment.

Figure 4A:
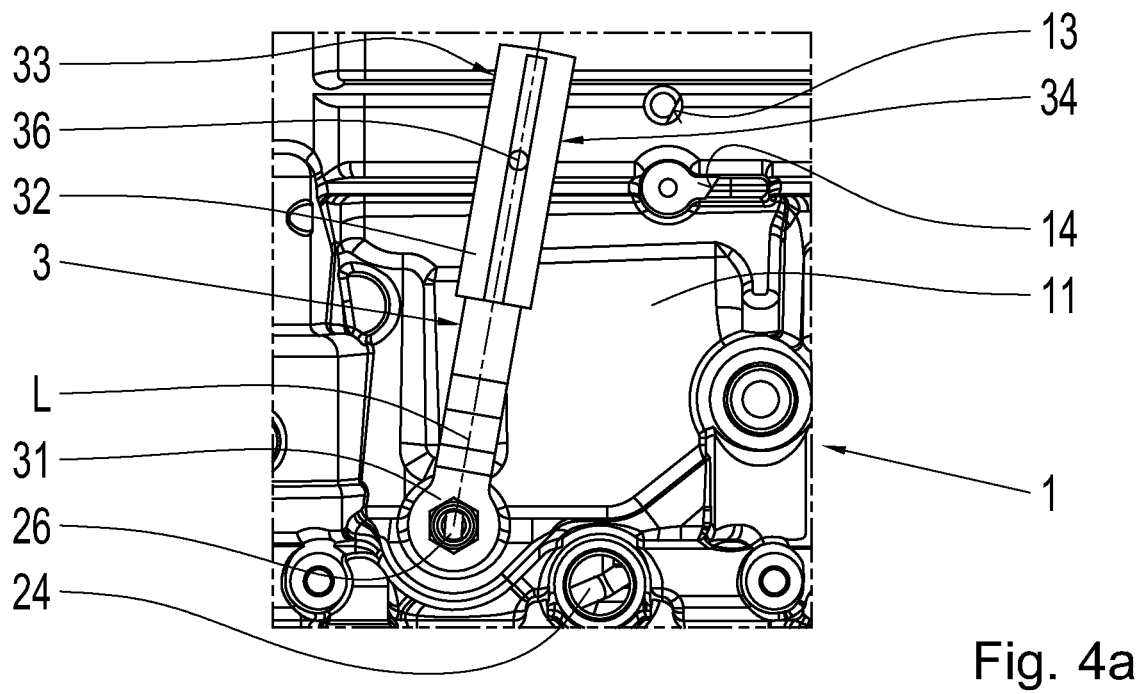
FIGS. 4a to 4e: A second embodiment of a hand lever for disengaging a parking lock, shown in different positions and/or views.
Figure 4B:
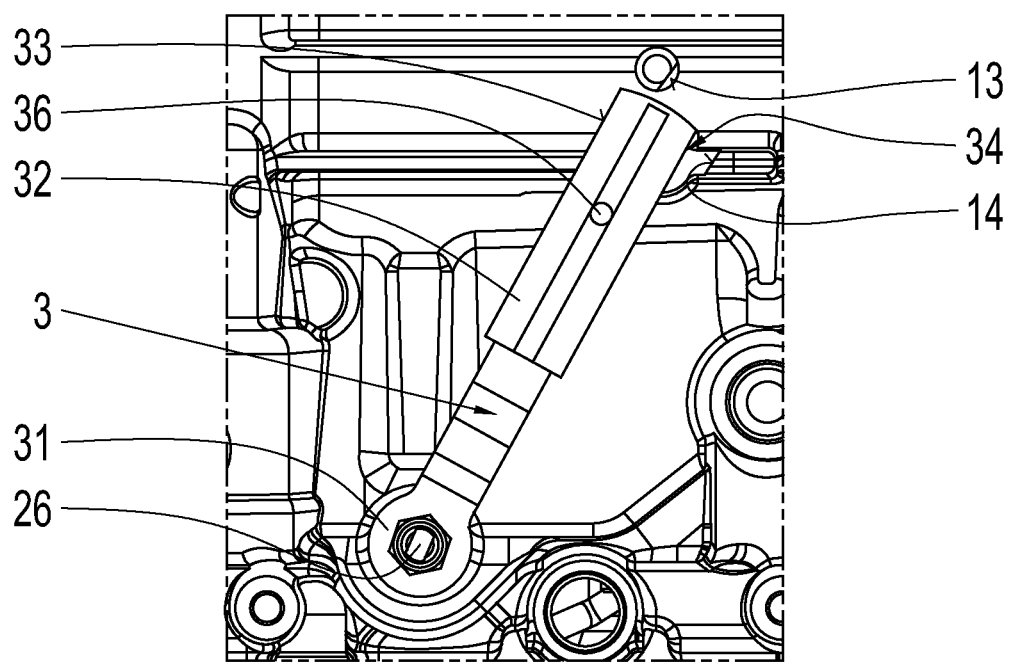
Figure 4C:
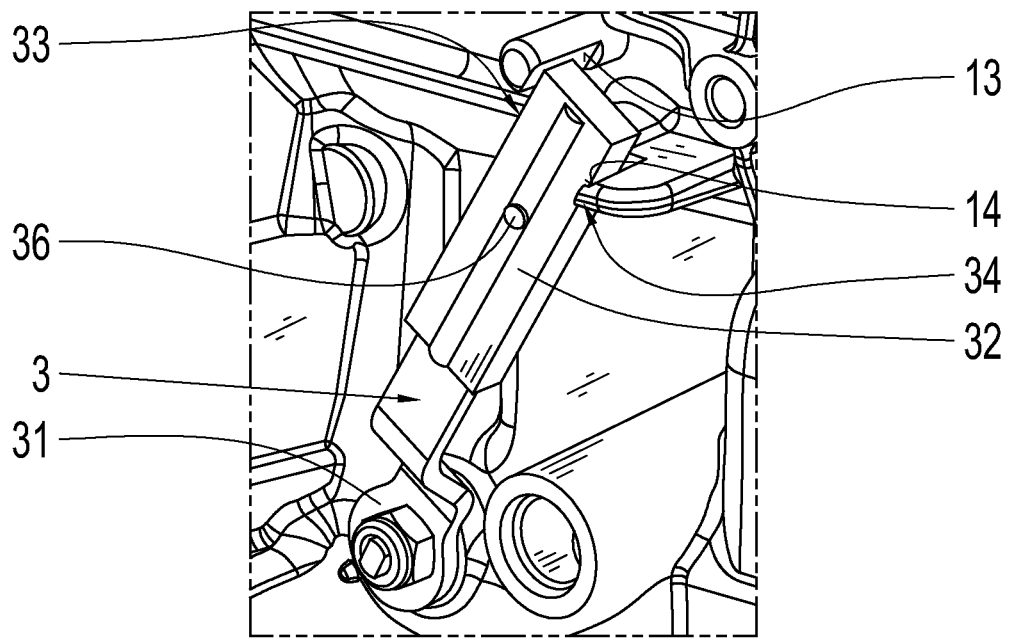
Figure 4D:
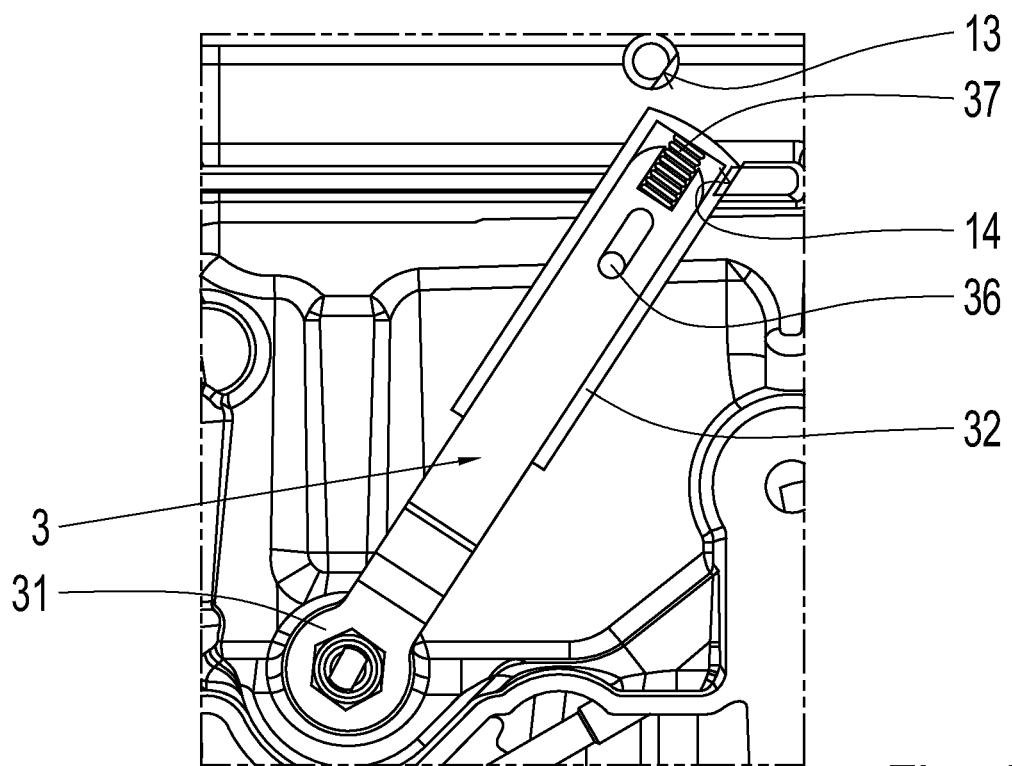
Figure 4E:
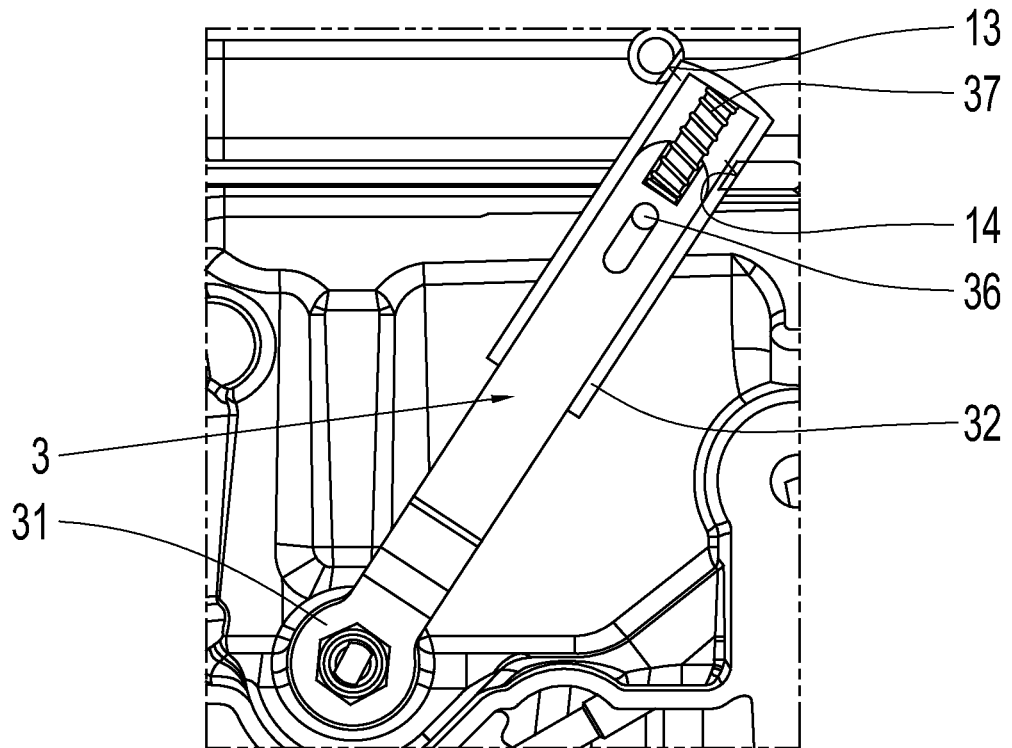

The second embodiment differs from the first embodiment essentially by a different securing device, which is arranged inside the gripping handle 32 (see in particular FIGS. 4d and 4e).

FIG. 4a shows the lever 3 arranged on the device 1 in the engagement position. The parking lock is here engaged.

FIG. 4b shows the lever 3 between the engaged position and the disengaged position. It can be seen clearly that in the disengaged position the lever 3 is shorter and that therefore when the gripping handle 31 is moved to the disengagement position can move past the first stop 13. At the same time however, the lever 3 is long enough to be able to rest against the second stop (see FIG. 4c).

FIG. 4c shows the lever 3 in the disengagement position. The gripping handle 31 has in this case already been moved to the locking position. Thus, the lever 3 is now long enough to be able to make contact against the first stop 13. The first stop 13 then prevents the lever from moving back from the disengagement position to the engagement position.

FIGS. 4d and 4e show, respectively, sectioned views through the lever 3 in its disengagement position. The securing device used can be seen, which device secures the gripping handle 32 against inadvertent movement out of the locking position. The lever 3 rests against the stop 14 and cannot therefore be pivoted any further.

In FIG. 4d the lever 3 is in the release position. For this, the gripping handle 32 is moved on the shaft of the fixing piece 31 in the direction of the shaft 26. Accordingly, the lever 3 is shortened and can be moved past the stop 13.

In FIG. 4e the lever 3 is in the locking position. For this, the gripping handle 32 has been displaced on the shaft of the fixing piece 31 away from the shaft 26. This increases the length of the lever 3 so that due to the stop 13 it cannot be pivoted back.

For the safety device, analogously to the first embodiment here too a cutout is provided in the fixing piece 31 inside the gripping handle 32. Analogously to the first embodiment a pin 36 passes though the cutout, which is fixed in the opposite sides of the gripping handle 32. Thus, the movement range of the gripping handle 32 on the fixing piece 31 is restricted. In this case as well, the two ends of the cutout define the release position and the locking position.

In the second embodiment a spring element 37 is provided. The spring element 37 exerts a spring force on the gripping handle 32, which pushed the gripping handle 32 to the locking position. For this, the spring element is arranged to act between the fixing piece and the gripping handle 32. In that way the gripping handle 32 adopts the locking position automatically.

Thus, to actuate the lever 3 the operator has to apply a sufficiently large manual force to the gripping handle 32 in order to overcome the spring force and move the gripping handle 32 from the locking position to the release position. That manual force must be maintained by the operator at least during the movement of the lever 3 past the stop 13. Then the operator can move the gripping handle 32 again to the locking position. This takes place with assistance by the spring force of the spring element 37 and is correspondingly easy to do. For example, the operator can reduce the manual force directed in opposition to the spring force of the spring element 37 by a sufficient amount and in that way allow the gripping handle 32 to slide or snap into the locking position. To disengage the parking lock, this takes place while maintaining the disengagement position.

The spring element 37 is for example arranged on the end area of the shaft of the fixing piece 31, on the gripping-handle side. Here, a notch is preferably provided in the fixing piece 31. The spring element 37 then sits on the fixing piece 31 with one of its ends at the bottom of the notch, and with its other end against the gripping handle 32. As shown here, the spring element 37 can for example be in the form of a helical spring. To provide sufficient space inside the gripping handle 32 for the spring element 37, at its front or back end the gripping handle 32 can have corresponding bulges.

FIGS. 5a to 5e show a third embodiment of a lever 3 that can be operated analogously to the second embodiment for the temporary disengagement of a parking lock. Below, only the differences from the second embodiment will be described. In other respects the explanations relating to the above-described embodiments also apply to this third embodiment.

Figure 5A:
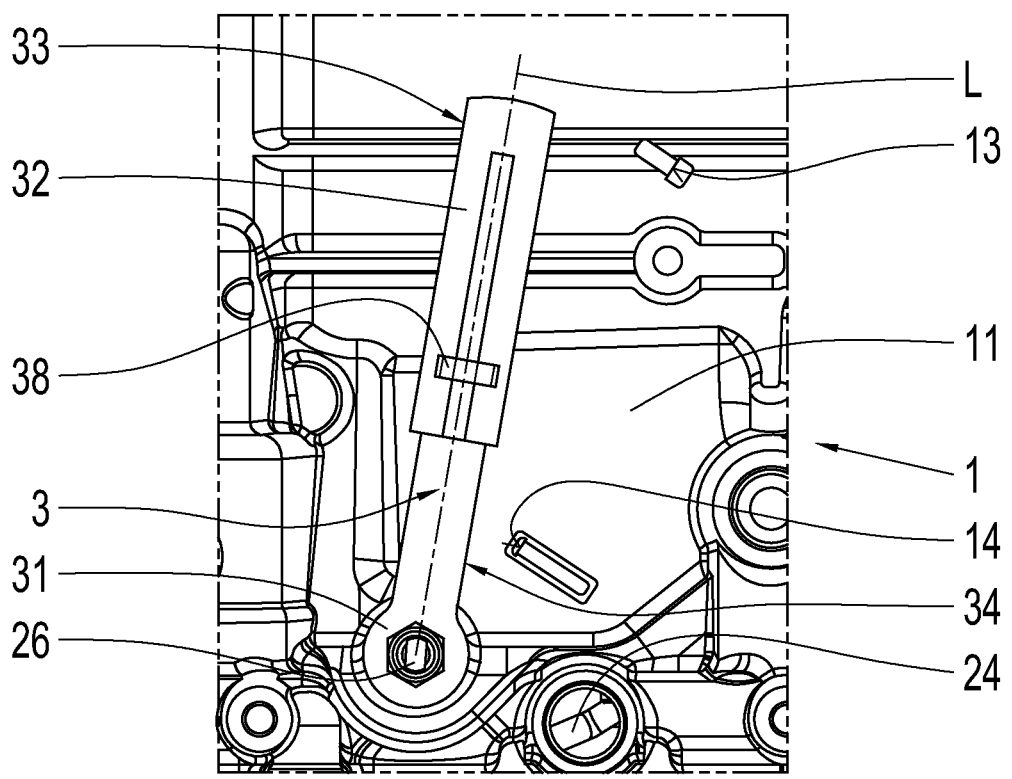
FIGS. 5a to 5e: A third embodiment of a hand lever for disengaging a parking lock, shown in different positions and/or views.

FIG. 5a shows the lever 3 arranged on the device 1 in the engaged position.

Figure 5B:
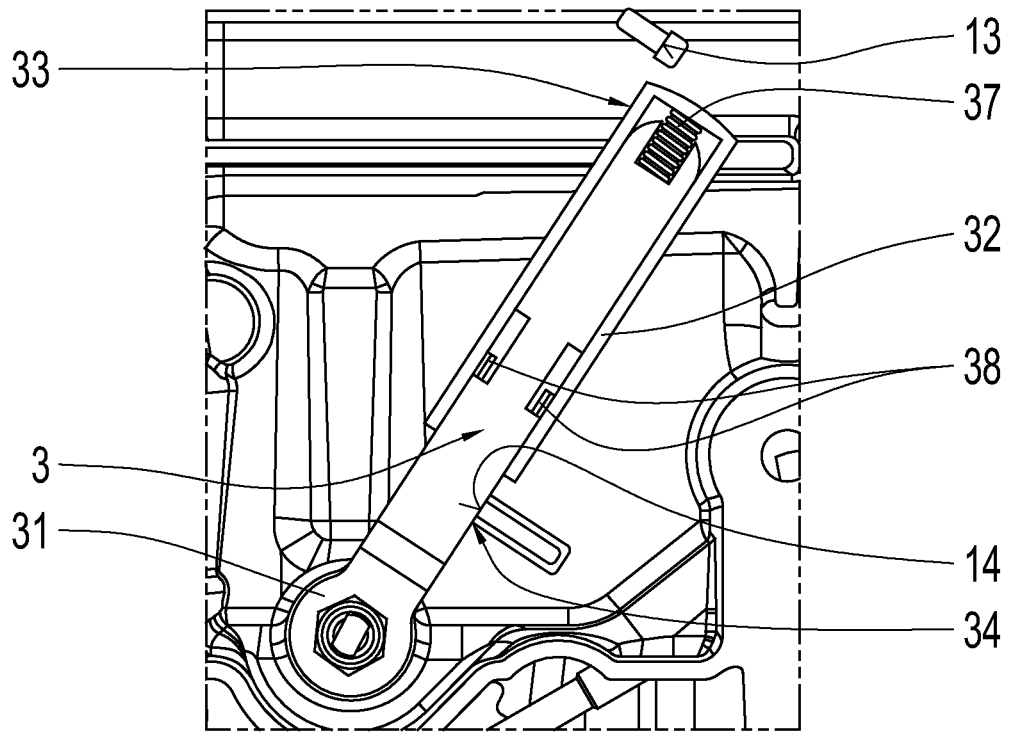

FIG. 5b shows a section through the lever 3 in the disengagement position, wherein the gripping handle 32 is moved in opposition to the spring force of the spring element 37, to the release position.

Figure 5C:
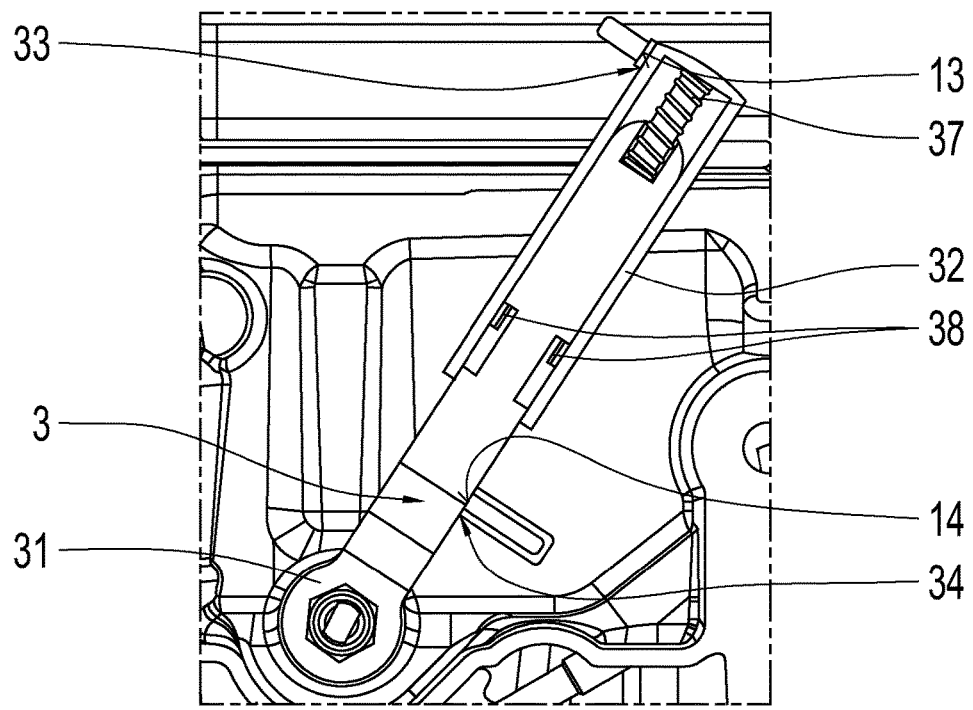

FIG. 5c shows a section through the lever 3 in the disengagement position, wherein the gripping handle 32 has been moved to the locking position at least with the assistance of the spring force of the spring element 37.

Figure 5D:
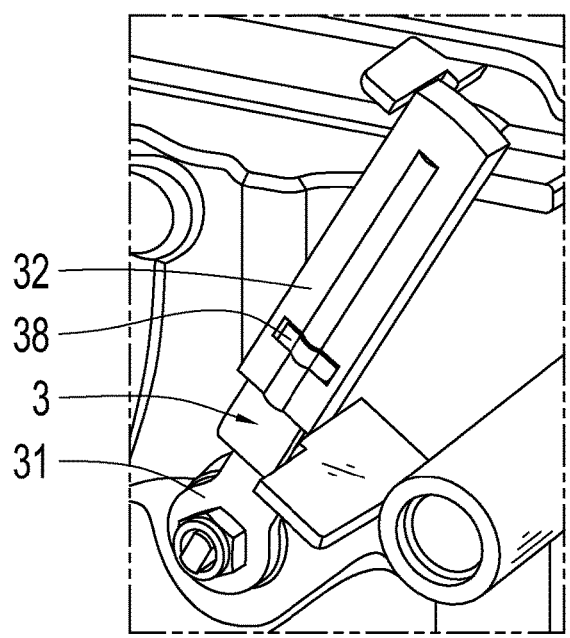

In FIG. 5d the lever 3 is in the same position as in FIG. 5c, but is not shown in cross-section.

Figure 5E:
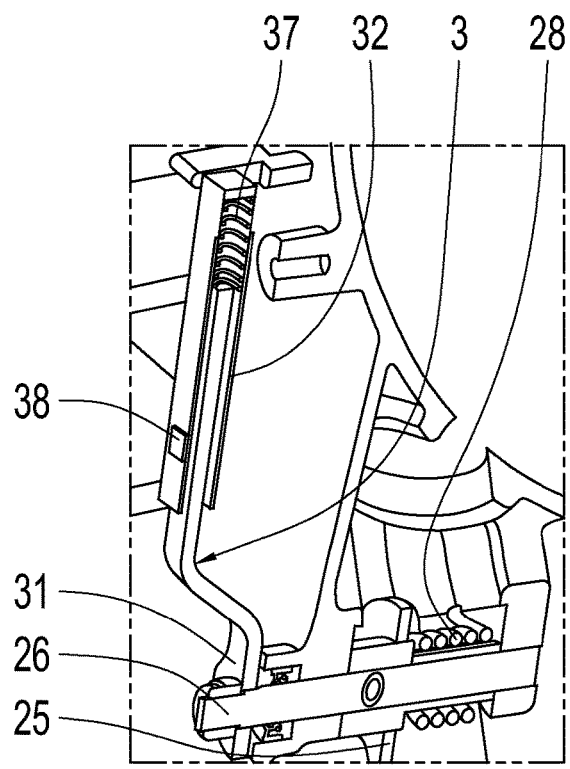

FIG. 5e shows a cross-section through the device 1 and the lever 3 in the same position as in FIGS. 5c and 5d. Here too, the parking lock shaft 26 and the spring element 28 of the parking lock and the parking lock plate 25 can be seen.

Otherwise than in the second embodiment, in the third embodiment shown in FIGS. 5a to 5e lateral cutouts are provided on the shaft of the fixing piece 31 and inside the gripping handle 32. These cutouts fulfill the same purpose as the cutout provided in the second embodiment (elongated slot as in FIGS. 4d and 4e). Thus, the cutouts limit the movement range of the gripping handle 32 on the fixing piece 31 and thereby define the release position and the locking position. Instead of a pin element, a bracket element 38 is now provided. The limbs of the bracket element 38 each pass through one of the lateral cutouts of the fixing piece 31. The bracket element 38 is fitted onto the gripping handle 32 from the outside, with its limbs passing through openings in the gripping handle 32 and projecting into the cutouts in the fixing piece 31. Thus, the bracket element 38 is fixed on the gripping handle 32 and moves along with it. In the release position and in the locking position the limbs in each case come into contact with the ends of the cutouts and prevent any further movement of the gripping handle 32.

In this way, on the gripping handle 32 and on the fixing piece 31 stops in the form of the cutouts and the limbs of the bracket 38 are created, which restrict the movement of the gripping handle 32 in the locking position and in the release position.

A further difference from the second embodiment is that in the third embodiment, the second contact area 34 of the lever 3 is provided on the fixing piece 31. The first contact area 33 is still on the gripping handle 32 in the area of the end of the lever 3 on the gripping handle side. On the other hand, although the second contact area is still on the shaft of the fixing piece 31, it is relatively close to the holder for the shaft 26. Thus, the contact areas 33, 34 are arranged at substantially different longitudinal positions of the lever 3. The stops 13, 14 provided in order to co-operate with the contact areas 33, 34 are correspondingly positioned quite far apart.

Preferably, the lever 3 consists of precisely the four structural components 31, 32, 36, 37 shown in FIGS. 5a to 5e.

FIGS. 6a to 6c show a fourth embodiment of a lever 3 for the temporary disengagement of a parking lock, that can be operated analogously to the second and third embodiments. Below, only the differences from the third embodiment will be described. In other respects, the explanations concerning the above-described embodiments apply to this fourth embodiment as well.

Otherwise than in the third embodiment, in the fourth embodiment the bracket element 38 is omitted. Instead, the gripping handle 32 has two projections 39 which engage in the cutouts on the shaft of the fixing piece 31. Thus, analogously to the bracket element 38 stops are formed on the gripping handle 32, which co-operate with the cutouts of the fixing piece 31. In this way the movement range of the gripping handle 32 on the fixing piece 31 is restricted and both the locking position and the release position are defined.

Preferably, the lever 3 consists precisely of the three structural components 31, 32, 37 shown in FIGS. 6a to 6c.

FIG. 6a shows the lever 3 in its entirety, not sectioned.

FIGS. 6b and 6c show the lever 3 in each case in a sectioned view, wherein the cutouts on the fixing piece and the projections 39 that co-operate with them can be seen. In FIG. 6b the gripping handle 32 has been moved to the release position in opposition to the spring force of the spring element 37. In FIG. 6c the gripping handle 32 has moved to the locking position, at least with the help of the spring force of the spring element 37.

FIGS. 7a to 7e show a fifth embodiment of a lever 3 that can be operated for the temporary disengagement of a parking lock, analogously to the first embodiment. Below, only the differences from the first embodiment will be described. In other respects the explanations concerning the above-described embodiments apply to this fifth embodiment as well.

Otherwise than in the first embodiment, in the fifth embodiment the pin element 36 is omitted. Instead, projections 310, 311 are provided on the fixing piece 31 and on the gripping handle 32. These co-operate with associated cutouts on the gripping handle 32 and the fixing piece 31.

Two projections 310 are arranged fixed on the shaft of the fixing piece 31. These serve to limit the movement range of the gripping handle 32 on the shaft of the fixing piece 31 and thereby define the locking position and the release position of the lever 3. For that purpose the projections 310 extend into a cutout in the gripping handle. The said cutout is in particular a longitudinal slot that extends along the longitudinal axis L. In the locking position and the release position, in each case one of the projections 310 comes into contact with the associated end of the cutout and thereby prevents any further movement of the gripping handle 32 on the fixing piece 31.

It is possible, instead of the two projections 310, for only one longitudinal projection 310 to be present, which extends over a corresponding length along the longitudinal axis L of the lever 3.

As shown in FIGS. 7a to 7e, the projections 310 are in particular arranged on the front side of the lever 3 facing away from the housing 11. Instead, they can also be on the back side of the lever 3 that faces toward the housing 11.

On the side of the lever 3 opposite the projections 310 a projection 311 is arranged fixed on the gripping handle 32. The projection 311 is directed inward, i.e. in the direction of the fixing piece 31. The projection 311 serves to detain the gripping handle 32 in the release position and in the locking position. For that purpose, the projection 311 co-operates with a recess or cutout in the shaft of the fixing piece 31 associated with one of the respective positions. In the embodiment shown, recesses are provided in the fixing piece 31. When the gripping handle 32 is moved between the release position and the locking position, a certain holding force has to be overcome, by which force the projection 311 is pressed into the recess or cutout. By virtue of a flexible curvature of the gripping handle 32 at the projection 311, the projection 311 can be brought out of engagement with the recess or cutout. As soon as the gripping handle 32 is moved thereafter to the respective other position, the projection 311 slips into the associated recess or cutout and thereby prevents any undesired reverse movement. In this way the securing device which secures the gripping handle 32 in the locking position and the release position is formed.

The projections 310 and the recesses corresponding to the projection 311 on the fixing piece 31 are preferably formed integrally with the fixing piece 31 by a stamping process. In that case the other parts of the fixing piece 31 can also be made in the same way. In particular the projections 310 and recesses can be made at the same time, in that the two projections 310 can be pressed out from the back side of the fixing piece 31. Thus, the fixing piece 31 can be produced particularly simply and inexpensively.

The gripping handle 32 can be produced together with the projection 311 simply and inexpensively by injection molding.

Preferably, the lever 3 consists precisely of the two structural components 31, 32 that can be seen in FIGS. 7a to 7e.

FIG. 7a shows the lever 3 arranged on the device 1 in the release position.

Figure 7B:
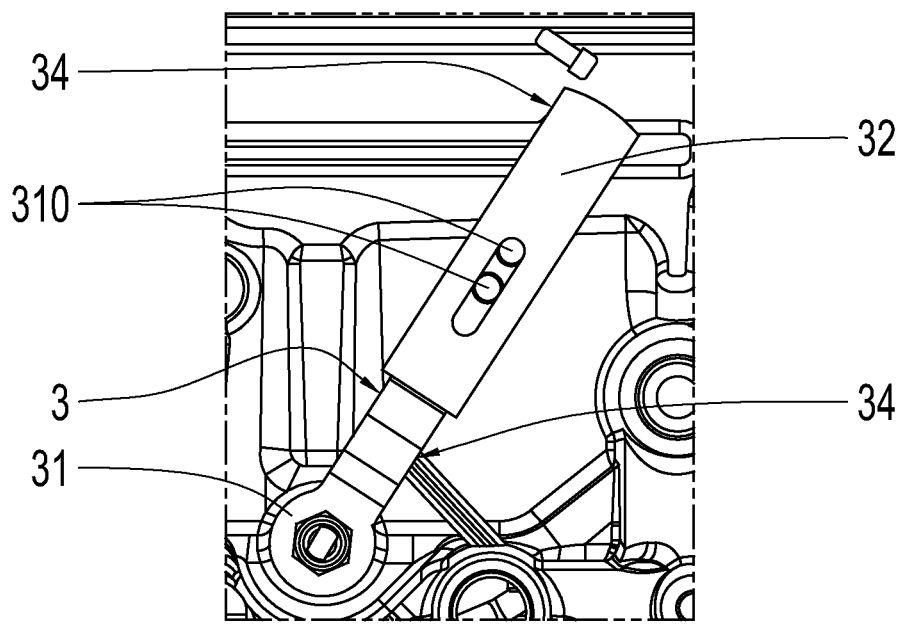

FIG. 7b shows the lever 3 in the disengagement position, with the gripping handle 32 in the release position.

Figure 7C:
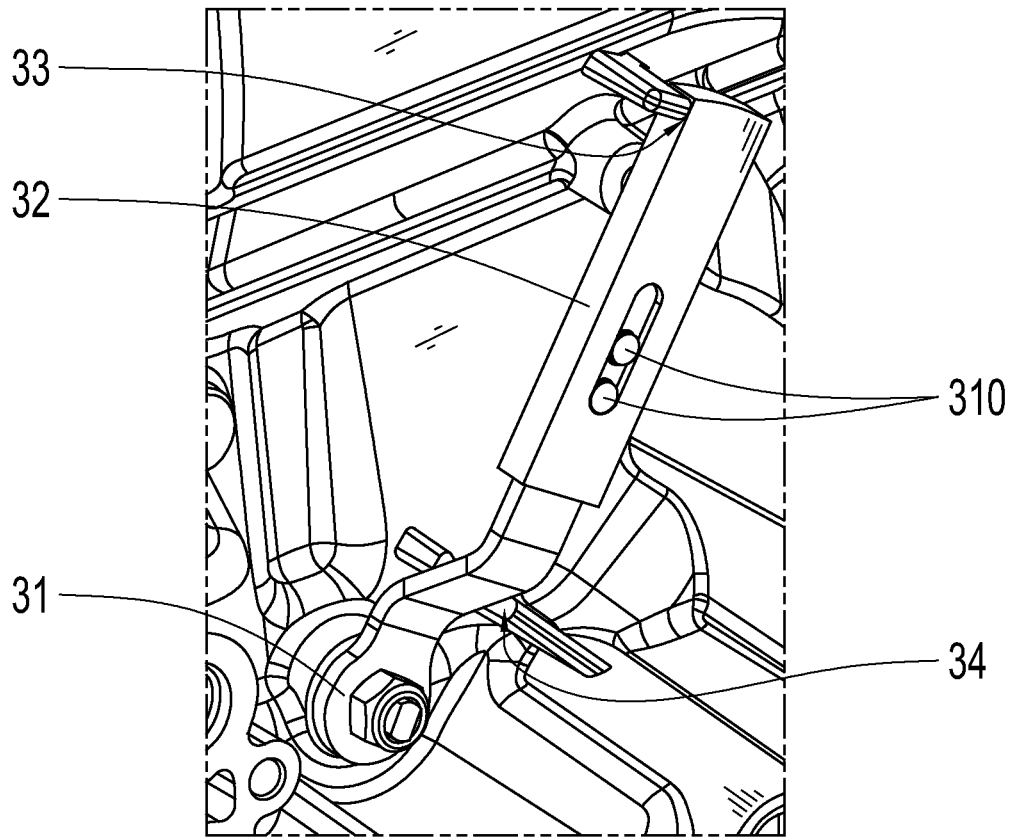
Figure 7D:
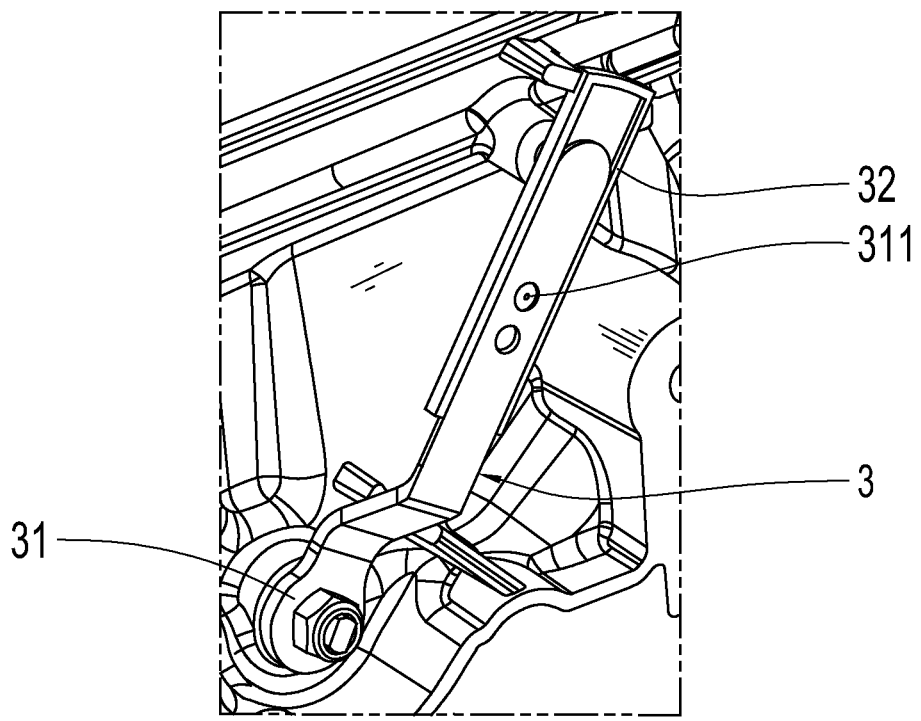
Figure 7E:
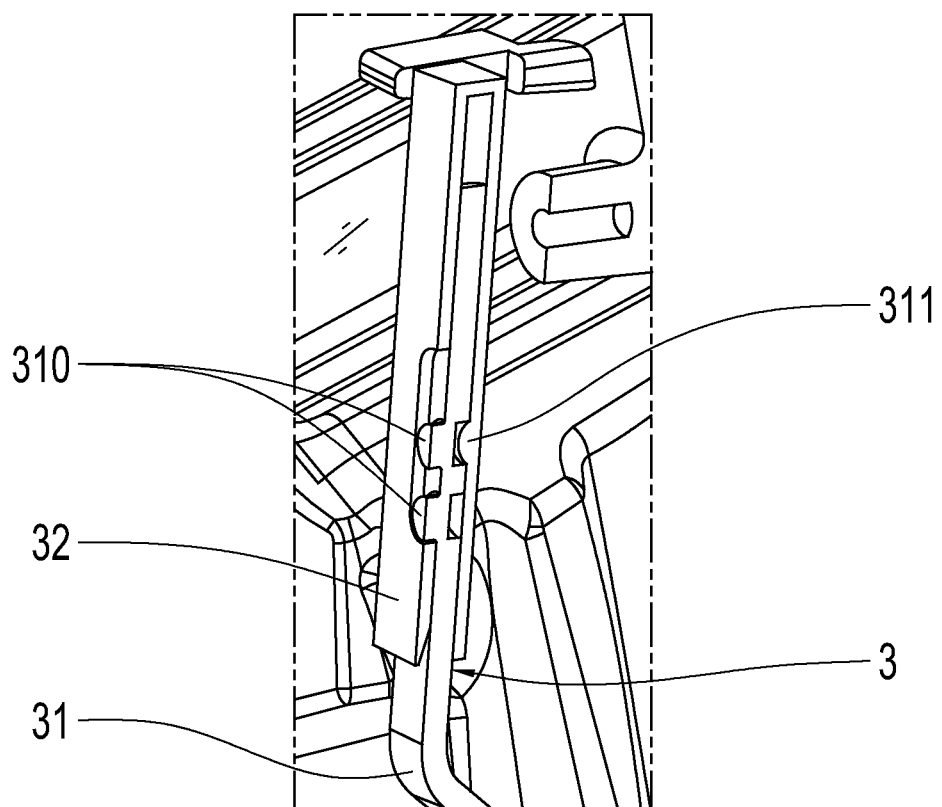

FIGS. 7c, 7d and 7e show the lever 3 in the disengagement position, wherein the gripping handle 32 has been moved to the locking position. Here, FIG. 7c shows a section through the lever 3, such that the projection 311 on the gripping handle 32 and the associated recesses on the fixing piece 31 can be seen. FIG. 7d shows a section through the lever 3, such that on the one hand the projections 310 on the fixing piece 31 and the associated recesses on the gripping handle 32, and on the other hand the projection 311 on the gripping handle 32 and the associated recesses in the fixing piece 31 can be seen at the same time in the longitudinal section.

FIGS. 8a to 8e show a sixth embodiment of a lever 3 for the temporary disengagement of a parking lock. The mode of operation and the handling principle correspond to those of the embodiments explained above. Otherwise than with the above-explained embodiments, however, the lever 3 in this case is made integrally. This means that the fixing piece 31 and the gripping handle 32 together form a single structural element and in particular are made together from a single semifabricate.

In this case the fixing piece 31 and the gripping handle 32 are not made so that they can move relative to one another. Thus, the gripping handle 32 cannot be moved between the release position and the locking position without moving the fixing piece 31 at the same time. Accordingly, at the interface with the shaft 26 the fixing piece 31 is designed such that the movement of the lever 3 between the release position and the locking position does not bring about any change of the position of the shaft 26. For example, this can be done if, as already explained earlier, in the end area of the shaft 26 its sides are flattened. The lever 3 has a corresponding slot to produce interlock in the rotation direction of the shaft 26. Preferably, the longitudinal direction of the said slot extends along the longitudinal axis L of the lever 3. Such a slot can, for example, be seen on the fixing piece 31 of the lever 3 in FIGS. 6a to 6c.

The lever 3 operates as follows: In the engaged position of the parking lock, the operator fits the lever 3 with the fixing piece 31 onto the end area of the shaft 26. The user secures the lever 3 there against slipping off the shaft 26 while at the same time maintaining the possibility of moving the lever 3 in the direction away from the housing 11. This, for example, is done in that the user does not tighten down the nut for fixing the lever 3 on the shaft 26, but leaves a definite play between the nut and the lever 3. The lever 3 now first adopts the release position, since in the normal condition the parking lock is automatically engaged.

Figure 8A:
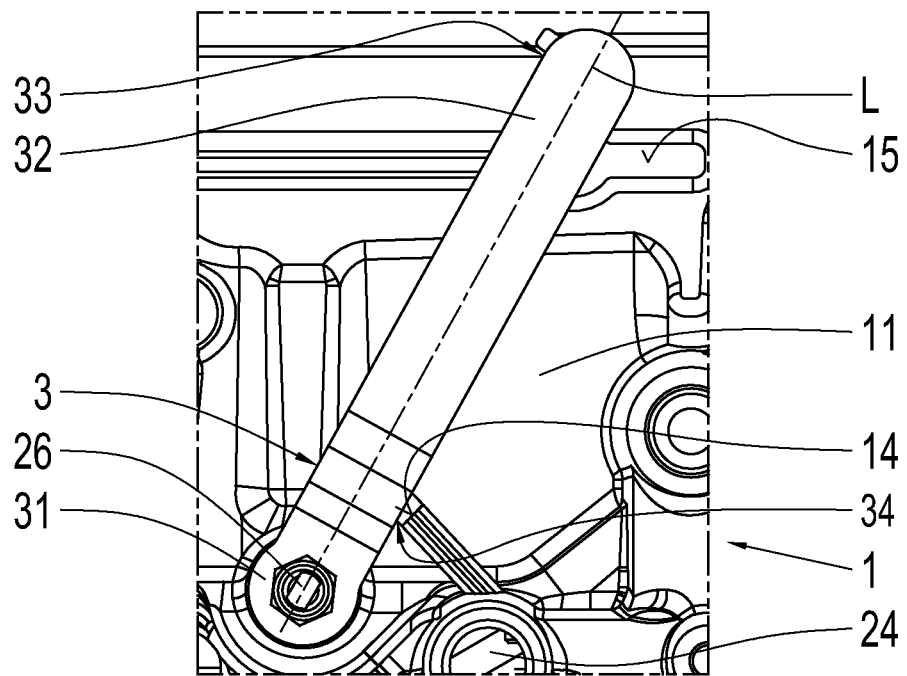
FIGS. 8a to 8d: A sixth embodiment of a hand lever for disengaging a parking lock, shown in different positions and/or views.
Figure 8B:
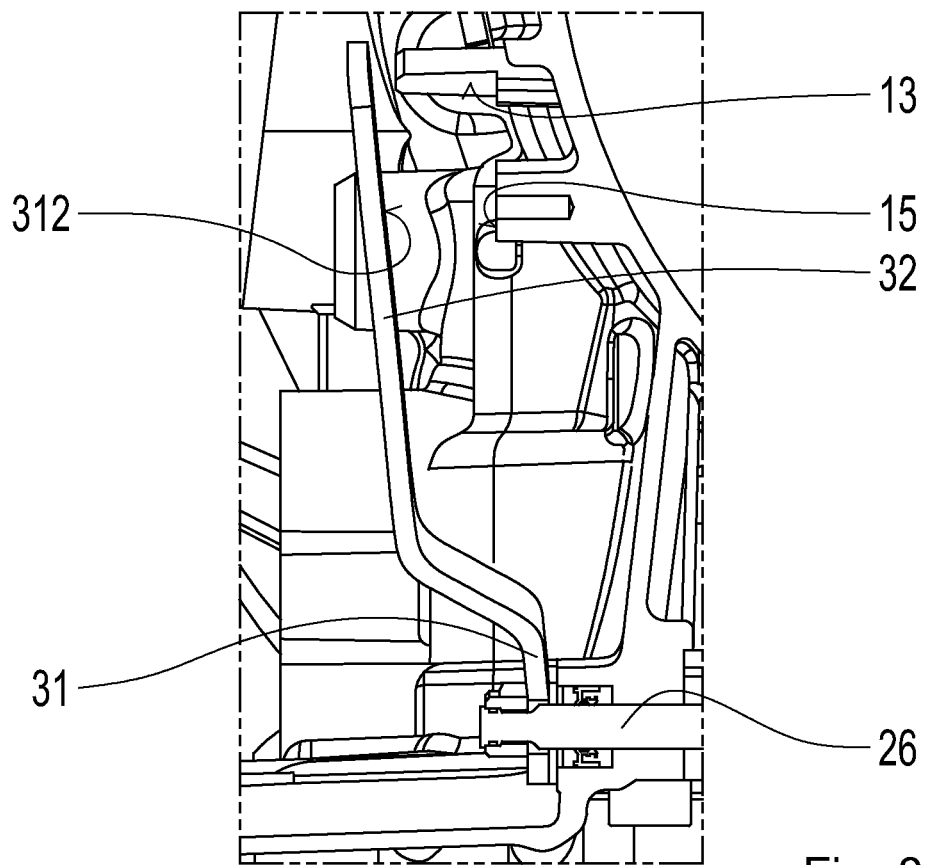
Figure 8C:
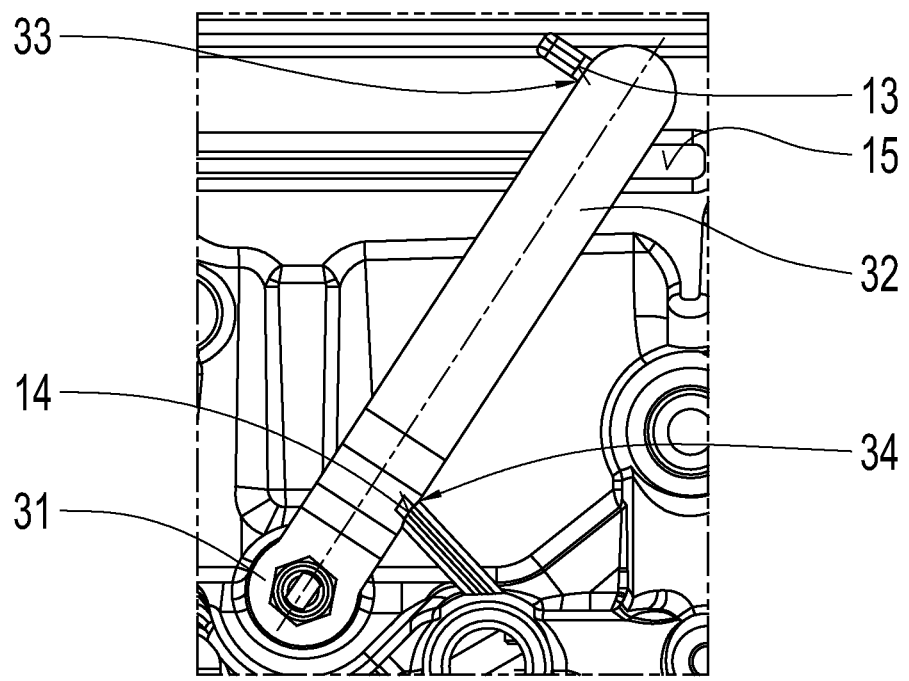
Figure 8D:
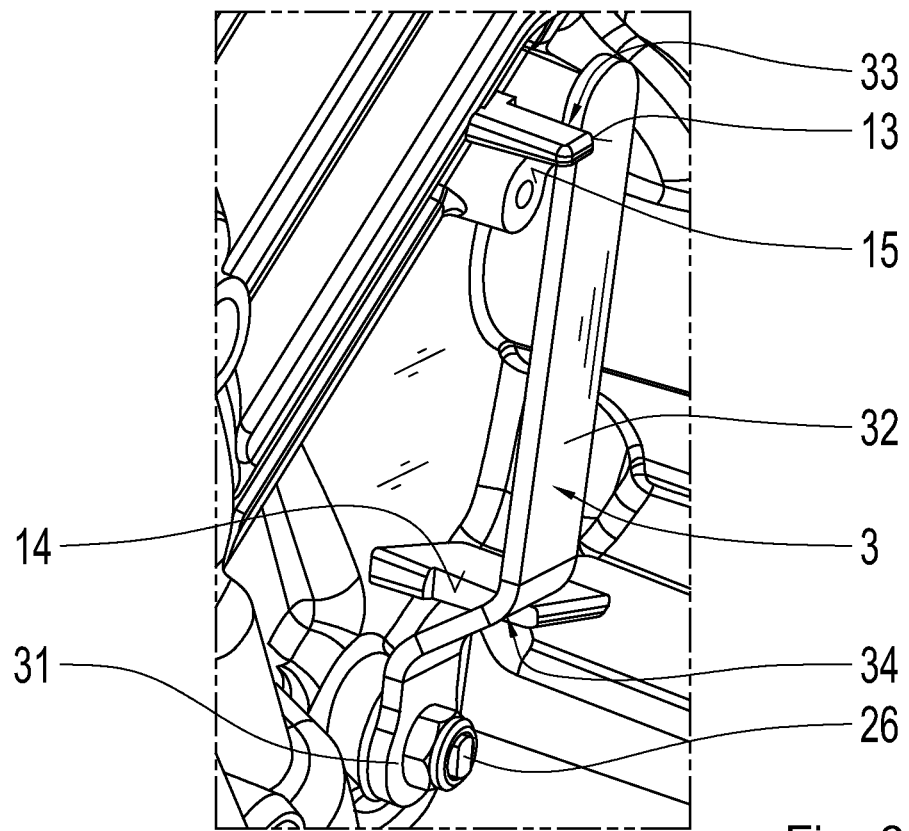

The operator then lays hold of the lever 3 at the gripping handle 32 and pivots it by a hand movement out of the engagement position to the disengagement position (see FIG. 8a). Previously or at the same time he pulls the lever 3 by a hand movement on the gripping handle 32 outward to its release position. In the release position the lever 3 is a distance away from the housing 11 (see FIG. 8b). Consequently, in this position the lever 3 can be moved past the first stop 13 to the disengagement position. There, the lever 3 with its contact area 34 comes up against the second stop 14 (see FIG. 8c). It can therefore not be pivoted further. This indicates to the operator that the lever 3 can now be moved to the locking position. For that, the operator presses the lever 3 while maintaining the disengagement position, by a hand movement on the gripping handle 32 in the direction toward the housing 11. The lever 3 then rests with its third contact area 312 against a third stop 15 of the housing 11. As soon as that has happened, the lever 3 is secured by the first stop 13 against rotating in reverse out of the disengagement position to the engagement position (see FIG. 8d). To exclude shaking loose of the lever 3, the user can now fully secure it in this position. Expediently, that is done by fully tightening the said nut down onto the shaft 26.

In this eighth embodiment too, the movement of the lever 3 between the engaged position and the disengaged position takes place along another movement axis than the movement of the lever 3 between the release position and the locking position. Here, those movement axes are mutually perpendicular.

In this way, when the locking position is engaged the lever 3 is secured against rotating in reverse to the engagement position. Consequently, the parking lock remains disengaged. The parking lock can be re-engaged by reversing the sequence. Since the lever is made integrally, it can be produced particularly simply by a stamping process.

Basically, with two-component levers 3 it is possible for the locking position and the release position of the lever 3 each to be set by rotating the gripping handle 32 about the longitudinal axis L of the lever 3. For this, the gripping handle 32 is arranged such that it can rotate on the shaft of the fixing piece 31. In particular, a guideway between the gripping handle 32 and the fixing piece 31 then ensures that when the gripping handle 32 is rotated on the fixing piece 31, the gripping handle 32 at the same time is displaced along the longitudinal axis L between the release position and the locking position. This guideway can for example be in the form of a slotted guideway extending obliquely on the lever 3, or a ramp, or a thread.

INDEXES

1 Vehicle drive unit
11 Housing
12 Drive output shaft
13 Stop
14 Stop
15 Stop
2 Parking lock
21 Parking lock wheel
22 Parking lock pawl
23 Parking lock cone
24 Parking lock rod
25 Parking lock plate
26 Parking lock shaft
27 Parking lock actuator system
28 Spring element
3 Lever
31 Fixing piece
32 Gripping handle
33 Contact area
34 Contact area
35 Spring element
36 Pin element
37 Spring element
38 Bracket element
39 Projection
310 Projection
311 Projection
312 Contact area
L Longitudinal axis

The invention claimed is:

1. A lever for the temporary disengagement of a parking lock of a vehicle drive unit, wherein:
   the lever comprises a fixing piece,
   the fixing piece is designed for fitting the lever onto a parking lock shaft which serves to actuate the parking lock and extends at least partially inside the vehicle drive unit,
   the lever is in the form of a dedicated hand lever with a gripping handle,
   the gripping handle is designed to be directly gripped by a user and thereby to enable manual force to be applied, by the user, for the manual actuation of the lever,
   the lever is designed such that when it is fitted onto the parking lock shaft:
      when the gripping handle is moved from an engagement position to a disengagement position, by movement of the fixing piece, the parking lock shaft moves with the gripping handle, and, in the engagement position, the parking lock is engaged whereas in the disengagement position the parking lock is disengaged, and
      in the disengagement position, by a further movement, the gripping handle is movable to a locking position in which the lever is blocked from a reverse movement out of the disengagement position.

2. The lever according to claim 1, in combination with a securing device which secures the gripping handle in at least one of the locking position or a release position.

3. The lever according to claim 1, wherein a length of the lever is variable.

4. The lever according to claim 1, wherein the gripping handle has a first contact area,
   the first contact area is designed to come into contact with a stop of the vehicle drive unit in the locking position to secure the lever against reverse movement out of the disengagement position.

5. The lever according to claim 4, wherein the first contact area and a second contact area are positioned at different longitudinal positions along the lever.

6. The lever according to claim 1, wherein the gripping handle or the fixing piece has a second contact area, and the second contact area is designed to come into contact with a stop of the vehicle drive unit, in the disengagement position, to prevent the lever from moving beyond the disengagement position.

7. A vehicle drive unit for an automatic vehicle transmission or an electric drive aggregate,
   with a parking lock,
   such that during normal operation, the parking lock is engagable and disengagable by an automatically carried out movement of a parking lock shaft,
   wherein the vehicle drive unit comprises a lever according to claim 1,
   the lever being able to be fitted onto the parking lock shaft in an outer area of the vehicle drive unit for the temporary manual disengagement of the parking lock.

8. A lever for the temporary disengagement of a parking lock of a vehicle drive unit, wherein:
   the lever comprises a fixing piece, the fixing piece is designed for fitting the lever onto a parking lock shaft which serves to actuate the parking lock and extends at least partially inside the vehicle drive unit, the lever is in the form of a hand lever with a gripping handle, the gripping handle is designed to be gripped and thereby to enable manual force to be applied, by a user, for the manual actuation of the lever, the lever is designed such that when the lever is fitted onto the parking lock shaft:

when the gripping handle is moved from an engagement position to a disengagement position, by movement of the fixing piece, the parking lock shaft moves with the gripping handle, and, in the engagement position, the parking lock is engaged whereas in the disengagement position the parking lock is disengaged, and in the disengagement position, by a further movement, the gripping handle is movable to a locking position in which the lever is blocked from a reverse movement out of the disengagement position, wherein the fixing piece and the gripping handle are designed to be movable relative to one another, and the gripping handle is movable relative to the fixing piece into the locking position.

9. The lever according to claim 8, wherein the gripping handle is arranged on the fixing piece so that the gripping handle can be one of rotated or displaced.

10. The lever according to claim 8, wherein a spring element acts between the gripping handle and the fixing piece, and spring biases the gripping handle into one of the locking position or a release position.

11. The lever according to claim 8, wherein each of the gripping handle and the fixing piece have a co-operating stop which limits the movement of the gripping handle in the locking position or in a release position.

12. A method for temporary disengagement of a parking lock of a vehicle drive unit by a hand lever which comprises a fixing piece and a gripping handle, the method comprising:

(a) fitting a fixing piece of the lever onto a parking lock shaft of the vehicle drive unit in an outer area of the drive unit, wherein the parking lock shaft extends at least partially inside the vehicle drive unit to facilitate gripping of the gripping handle by a user, the parking lock shaft disengages the parking lock when the parking lock shaft moves to a disengagement position; and then (b) manually moving the hand lever to the disengagement position by gripping the gripping handle and applying a manual force on the gripping handle so that the parking lock is disengaged; and then (c) moving the gripping handle to a locking position in which the hand lever and, hence also the parking lock shaft, are blocked against a reverse movement out of the disengagement position.

* * * * *